US 8,291,261 B2

(12) United States Patent
Malleck et al.

(10) Patent No.: US 8,291,261 B2
(45) Date of Patent: Oct. 16, 2012

(54) LIGHTWEIGHT APPLICATION-LEVEL RUNTIME STATE SAVE-AND-RESTORE UTILITY

(75) Inventors: Mark Allen Malleck, Newcastle, WA (US); Christopher W. Jones, Seattle, WA (US); Kevin S. Brockway, Seattle, WA (US); Thomas Robert Grubbs, Issaquah, WA (US); Paul G. Allen, Seattle, WA (US); Michael Owen Stacie, Kirkland, WA (US)

(73) Assignee: Vulcan Technologies LLC, Seattle, WA (US)

( * ) Notice: Subject to any disclaimer, the term of this patent is extended or adjusted under 35 U.S.C. 154(b) by 328 days.

(21) Appl. No.: 12/291,164

(22) Filed: Nov. 5, 2008

(65) Prior Publication Data
US 2010/0115334 A1   May 6, 2010

(51) Int. Cl.
G06F 11/00 (2006.01)
(52) U.S. Cl. ............... 714/15; 714/6.1; 714/6.2; 714/20
(58) Field of Classification Search ............... 714/6, 15, 714/20, 6.1, 6.2
See application file for complete search history.

(56) References Cited

U.S. PATENT DOCUMENTS

| | | | | |
|---|---|---|---|---|
| 5,712,971 A * | 1/1998 | Stanfill et al. | ..................... | 714/34 |
| 5,832,283 A * | 11/1998 | Chou et al. | ..................... | 713/300 |
| 6,044,475 A * | 3/2000 | Chung et al. | ..................... | 714/15 |
| 6,766,471 B2 * | 7/2004 | Meth | .............................. | 714/16 |
| 6,848,106 B1 * | 1/2005 | Hipp | ............................. | 719/312 |
| 6,917,963 B1 * | 7/2005 | Hipp et al. | ..................... | 709/204 |
| 7,028,140 B2 * | 4/2006 | Tabuchi et al. | ................ | 711/114 |
| 7,174,438 B2 * | 2/2007 | Homma et al. | ............... | 711/161 |
| 7,181,646 B2 * | 2/2007 | Kano | ................................ | 714/20 |
| 7,373,364 B1 * | 5/2008 | Chapman | ............................. | 1/1 |
| 7,376,865 B2 * | 5/2008 | Kano | ............................... | 714/15 |
| 7,574,591 B2 * | 8/2009 | Downer et al. | ................... | 713/1 |
| 7,590,887 B2 * | 9/2009 | Kano | ............................... | 714/15 |
| 7,634,685 B2 * | 12/2009 | Henrickson | ......................... | 714/6 |
| 7,661,028 B2 * | 2/2010 | Erofeev | ........................... | 714/15 |
| 7,669,081 B2 * | 2/2010 | Lett et al. | ......................... | 714/20 |
| 7,676,503 B2 * | 3/2010 | Van Ingen et al. | ............... | 714/15 |
| 7,716,461 B2 * | 5/2010 | Downer et al. | ..................... | 713/1 |
| 7,720,817 B2 * | 5/2010 | Stager et al. | ................... | 707/649 |
| 7,739,463 B2 * | 6/2010 | Tabuchi et al. | ................ | 711/161 |
| 7,784,098 B1 * | 8/2010 | Fan et al. | ......................... | 726/25 |
| 2003/0236826 A1 * | 12/2003 | Islam et al. | ..................... | 709/203 |
| 2004/0066414 A1 | 4/2004 | Czerwinski et al. | | |
| 2004/0218592 A1 * | 11/2004 | Nagar et al. | ................... | 370/381 |
| 2004/0230954 A1 * | 11/2004 | Dandoy | ......................... | 717/124 |
| 2005/0010924 A1 * | 1/2005 | Hipp et al. | ..................... | 718/104 |
| 2005/0066037 A1 * | 3/2005 | Song et al. | ..................... | 709/227 |
| 2005/0102396 A1 | 5/2005 | Hipp | | |
| 2005/0216535 A1 * | 9/2005 | Saika et al. | ................... | 707/204 |

(Continued)

*Primary Examiner* — Joshua P Lottich
(74) *Attorney, Agent, or Firm* — Olympic Patent Works, PLLC

(57) ABSTRACT

Embodiments of the present invention are directed to computer-management tools and utilities that allow computer users to save and restore current application-level runtime states of computational environments created by users on computer systems. Certain embodiments of the present invention are particularly directed to time-and-memory efficient state-saving and state-restoring tools and utilities that allow a user to save snapshots of the user's application-level runtime environment, to manage and review stored snapshots, and to subsequently restore the application-level runtime state of a computer system from a previously saved snapshot.

20 Claims, 29 Drawing Sheets

U.S. PATENT DOCUMENTS

| | | | |
|---|---|---|---|
| 2005/0268301 A1* | 12/2005 | Kelley et al. | 718/100 |
| 2006/0020858 A1 | 1/2006 | Schaefer | |
| 2006/0041927 A1* | 2/2006 | Stark et al. | 725/139 |
| 2006/0080370 A1* | 4/2006 | Torii et al. | 707/204 |
| 2006/0123233 A1* | 6/2006 | Aaron | 713/166 |
| 2006/0143242 A1* | 6/2006 | Hara | 707/203 |
| 2006/0195493 A1 | 8/2006 | Chang | |
| 2007/0162785 A1* | 7/2007 | Downer et al. | 714/15 |
| 2007/0214334 A1* | 9/2007 | Maruyama et al. | 711/165 |
| 2008/0034307 A1* | 2/2008 | Cisler et al. | 715/764 |
| 2008/0042923 A1* | 2/2008 | De Laet | 345/1.3 |
| 2008/0201307 A1* | 8/2008 | Swartz | 707/3 |
| 2008/0201724 A1* | 8/2008 | Endrikhovski et al. | 719/318 |
| 2008/0307345 A1* | 12/2008 | Hart et al. | 715/769 |
| 2009/0063422 A1* | 3/2009 | Kodama | 707/3 |
| 2009/0144515 A1* | 6/2009 | Benari | 711/162 |
| 2009/0300641 A1* | 12/2009 | Friedman et al. | 718/104 |
| 2010/0281049 A1* | 11/2010 | Simek et al. | 707/769 |

* cited by examiner

LIGHTWEIGHT APPLICATION-LEVEL RUNTIME STATE SAVE-AND-RESTORE UTILITY

TECHNICAL FIELD

The present invention is related to tools and utilities for managing and maintaining computer systems and, in particular, to a tool that allows the user of a computer system to store the application-level runtime state of the computer system at particular points in time and to subsequently restore the computer system to a previously stored application-level runtime state.

BACKGROUND OF THE INVENTION

During the past 50 years, the computational bandwidths and data-storage capacities of computer systems have increased exponentially. Currently available personal computers, which can be purchased for under $1,000, provide greater computational bandwidth and data-storage capacity than the largest supercomputers of two generations past. The rapid improvement in the capabilities of computer systems has provided the basis for significant, continuous improvements in application programs, management tools, operating systems, and a host of other software-implemented functionalities provided to computer users by various programs that execute within computer systems. While, 40 years ago, computer users routinely loaded programs coded in punched cards for stand-alone execution within primitive execution environments, even a casual personal-computer user can today launch tens of powerful, concurrently-executing application programs that interact with one another as well as with applications programs executing on remote computer systems and with remote data-storage systems.

Modern operating systems provide a variety of powerful computer-system management tools, as do certain application programs. The vast increase in functionality, computing bandwidth, and data-search capacity have led to increasingly complex patterns of computer usage. Even a casual computer user may easily create very complex computational states as a result of launching multiple application programs and interacting with them using multiple associated windows and graphical user interfaces. Management of computer systems in such complex contexts is not adequately addressed by many currently-available tools and utilities. For this reason, researchers and developers, operating-system and application-program developers, computer vendors, software vendors, and ultimately users of computer systems continue to seek useful and powerful management tools to assist computer users in managing the complex runtime states that users may create during the course of launching and interacting with multiple application programs.

SUMMARY OF THE INVENTION

Embodiments of the present invention are directed to computer-management tools and utilities that allow computer users to save and restore current application-level runtime states of computational environments created by users on computer systems. Certain embodiments of the present invention are particularly directed to time-and-memory efficient state-saving and state-restoring tools and utilities that allow a user to save snapshots of the user's application-level runtime environment, to manage and review stored snapshots, and to subsequently restore the application-level runtime state of a computer system from a previously saved snapshot.

DETAILED DESCRIPTION OF THE INVENTION

Figure 1:
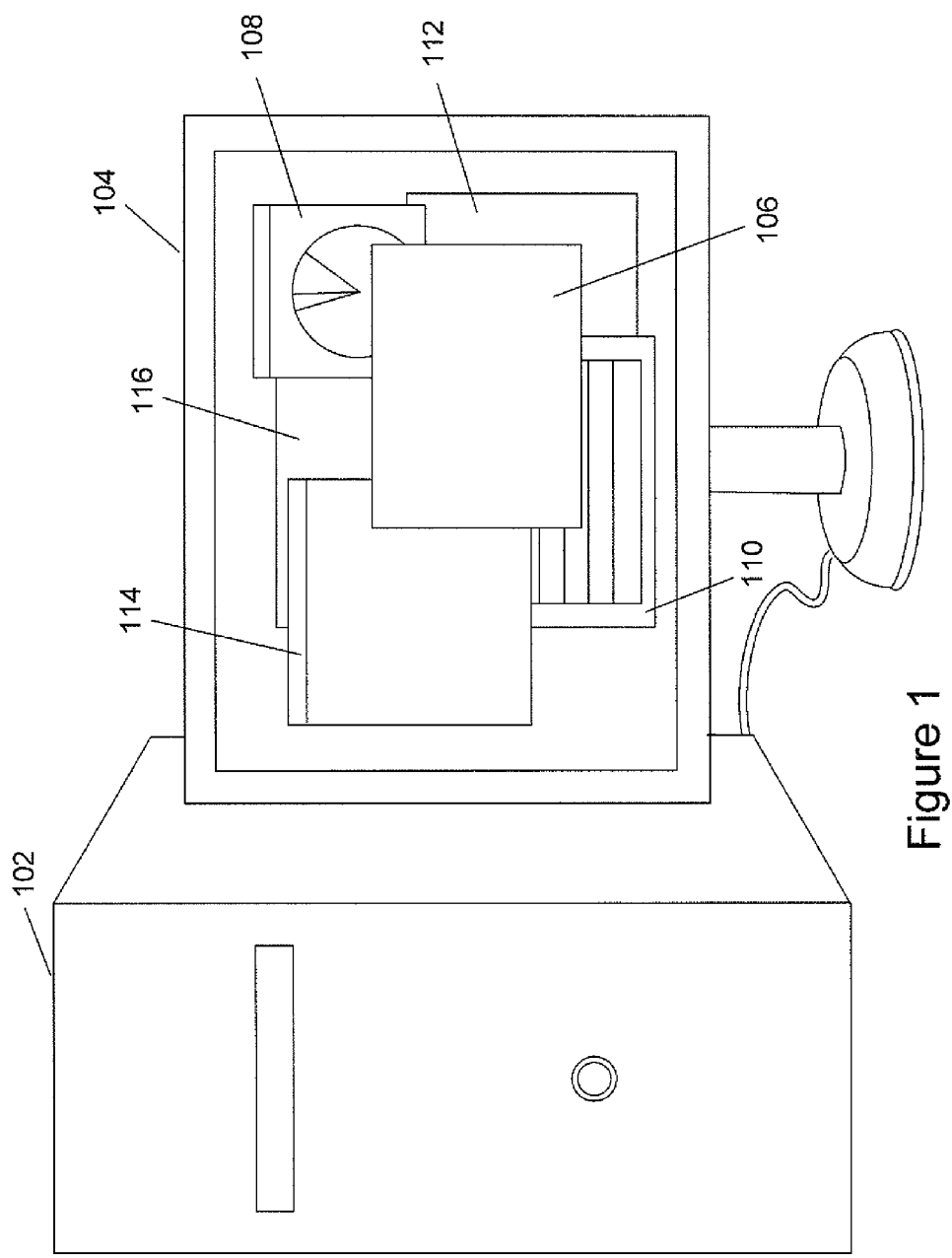
FIG. 1 illustrates a personal computer and application-level runtime state.

Embodiments of the present invention are directed to lightweight application-level-runtime-state save-and-restore management tools and utilities. FIG. 1 illustrates a personal computer and application-level runtime state. The personal computer includes a device enclosure 102 and display monitor 104, as well as various input/output ("I/O") controls, such as keyboards, mice, and other I/O devices, not shown in FIG. 1 From the perspective of a user, the current application-level runtime state of a computer system can be thought of as the number, sizes, positions, and overall organization of currently open application windows and other graphically represented objects and entities displayed on the display device 104, as well as a list of the application programs currently executing on the computer system. For example, in FIG. 1, a hypothetical user has launched, and is interacting with, a business-application program, associated with two windows 106 and 108, an email program associated with one window 110, an Internet browser associated with a browser window 112, and a word processing program associated with a displayed document 114. Additional windows and applications, including window 116, currently reside within a set of background objects associated with application programs with which the user is not currently interacting. From the user's standpoint, all of the currently running application programs, and associated windows, including windows that may have been minimized and are displayed as small icons, comprise the application-level runtime state of the computer system.

For many computer users, the runtime state of the computer system is quite dynamic, and changes throughout each period of time during which the computer users interact with heir computer systems. For example, a computer user may edit a text document using a text editor, save the text document, open another blank document and cut and paste text from an Internet browser to the blank document, launch a spreadsheet or business application, save the text document and close the text editor, and continue to launch, close, and interact with various additional, different application programs. A user may discontinue interacting with the computer system in order to perform other tasks, and may then return to the computer system at a later time to resume interacting with the various application programs, expecting the application-level state of the computer system to be virtually identical to the application-level state at the time the user left the computer to carry out the other tasks. Alternatively, a user may interact with some number of application programs up until a point in time at which the user launches a different set of applications and begins interacting with those applications while the applications with which the user was previously interacting are suspended, and remain dormant in the background, while the user proceeds to interact with the newly launched application programs.

Although a user expects to be able to return to a previous application-level state by, for example, returning to the computer system which the user temporarily abandoned in order to attend to other affairs, or by closing currently displayed application windows so that the application windows with which the user was previously interacting emerge from the background, there are many cases in which application-level runtime state is lost. Examples include power failures, inadvertent shutting down of applications and/or the operating system, application-program failures, and many other types of events. As another example, a user may be engaged in a series of complex tasks at a workplace and need to leave work and resume working at home on a different computer system with a generally much different application-level runtime state than that of the workplace computer system.

It would be enormously useful for a user to be able to save the current application-level runtime state of a computer system or, in other words, take a snapshot of the current application-level runtime state of the computer system so that, in the event that the current application-level state is partially or completely lost, due to any of the various events discussed above, a user could restore the application-level runtime state of the computer system to the application-level state previously captured in the snapshot. The concept of saving and restoring data states is well known in a variety of different contexts, including database management systems and text editors. Many database management systems allow the current data state of a database to be saved, as a snapshot, to allow the database to be subsequently restored to that data state in the event of intervening database failures or database corruptions. Similarly, certain text editors allow for incremental saving of the current state of a document that is being edited. These save and restore operations are directed to data, rather than to the current runtime state of database or text-editor applications. Certain operating systems allow a computer-system configuration to be saved, and the computer subsequently returned to that configuration by a restore operation. However, operating-system configuration store and configuration restore operations do not store and recover the current runtime environment, including current state of executing application programs, displayed windows, open files, and other resources associated with executing application programs, but are instead essentially data-state save-and-restore utilities.

Figure 2:
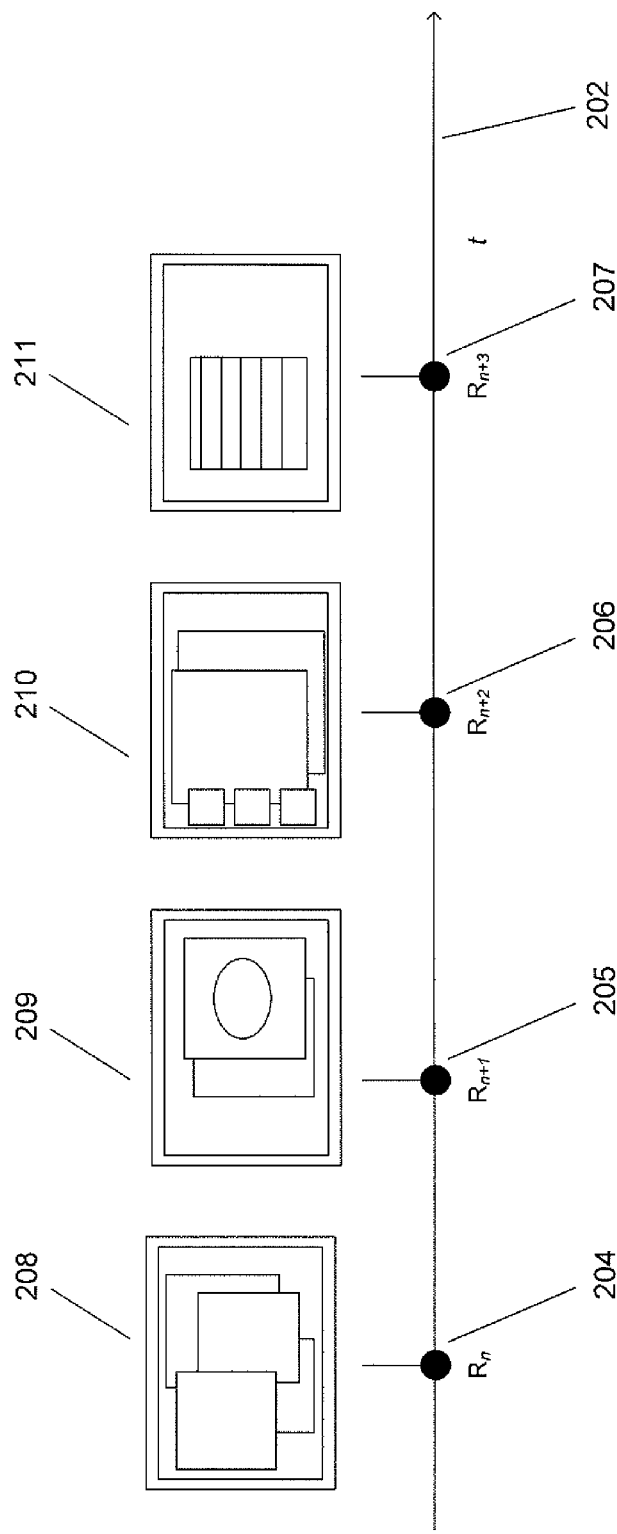
FIG. 2 illustrates an application-level-runtime-state snapshot operation.

FIG. 2 illustrates an application-level-runtime-state snapshot operation. In FIG. 2, a horizontal timeline 202 represents the time during which a user interacts with a computer system. At various points in time 204-207, the user desires to save the current runtime state of the computer system, represented in FIG. 2 by the current information displayed by the display monitor 208-211 at each point in time 204-207, respectively. A user may wish to save a snapshot of the runtime state of the computer system frequently, during the course of interacting with a computer system, by manual application of the snapshot or state-save operation, or may alternatively wish to configure automatic snapshot operations so that, in the event of any of various different types of failures or other events, the user can easily return to a previous application-level runtime state by selecting the appropriate snapshot and executing a restore operation on that snapshot.

Figure 3:
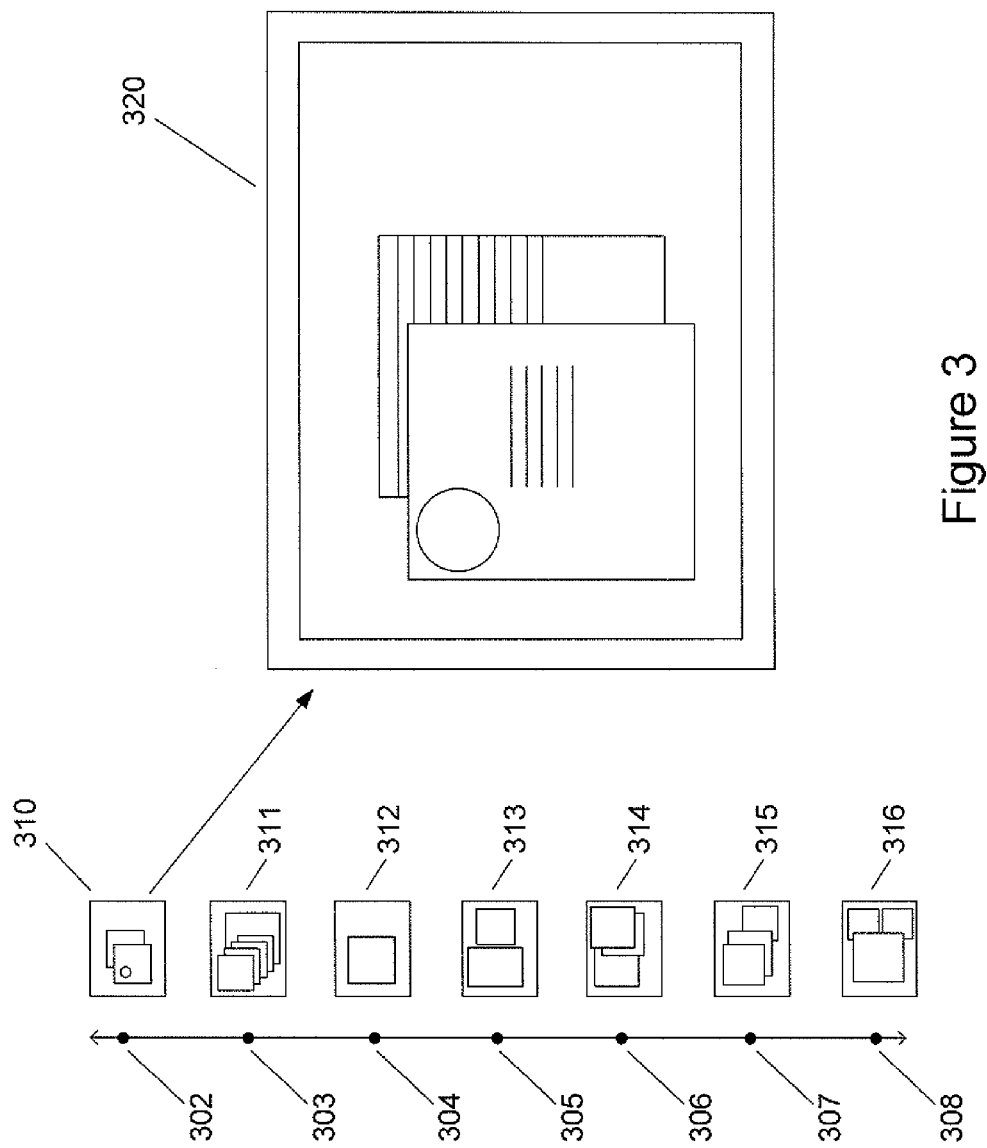
FIG. 3 illustrates an application-level-runtime-state restore operation.

FIG. 3 illustrates an application-level-runtime-state restore operation. In FIG. 3, a series of snapshots are represented by points in time 302-308 and corresponding thumbnail images of the application-level runtime state of the computer system, as revealed by the information displayed by the display monitor 310-316 at those points in time. A user may select any particular snapshot, such as snapshot 310 taken at time 302, and invoke a restore operation in order to restore the application-level runtime state of the computer system 320 to the application-level runtime state captured in the snapshot.

As mentioned above, various applications programs and operating systems provide different types of data-state save-and-restore utilities, but there are currently no management tools that allow computer user to save the application-level runtime state of a computer system and restore a saved application-level runtime state at a later time. Although there are special runtime-state capture tools and utilities developed for computer-system debugging and analysis by software engineers, these tools and utilities are generally complex, have complex interfaces and functionality sets, are intended for exclusive use by computer professionals who understand the structure and operational characteristics of operating systems, and are generally extremely time inefficient and require storage of massive amounts of data. They are clearly not designed for convenient and frequent saving and restoration of application-level runtime states by general computer users.

FIGS. 4-7 illustrate aspects of the runtime state of a computer system. FIGS. 4-7 illustrate why saving of even a partial runtime state of a computer system can be a very time-inefficient and data-storage-space-inefficient operation. While a computer user, as discussed above with respect to FIG. 1, considers the runtime state of a computer system to comprise the number of currently executing application programs and windows, open files, and other resources associated with those application programs, the actual, complete state of a computer system is far more complex. It is, in fact, generally not possible to capture the complete state of a computer system at any instant in time, because the complete state of a computer system includes the current states of various electronic components that may not be accessible to state-capturing management tools and that, even were they accessible, have complex and rapidly changing states that cannot be instantaneously captured, particularly since their states are significantly perturbed by any attempt to capture the state of the computer system in which they reside. A close approximation to instantaneous complete-state capture is carried out by the hibernation feature provided by certain operating systems. Upon receiving a hibernation command, these systems attempt to reach a quiescent state with respect to hardware components, and save the memory-state of the computer system to a mass-storage device. When the system is brought back up, the memory state is restored, However, the hibernation feature does not represent a reasonable approach to application-level runtime-state snapshot-and-restore operations, being extremely inefficient in time and storage resources, applicable only to a single computer system, and often unreliable.

Figure 4:
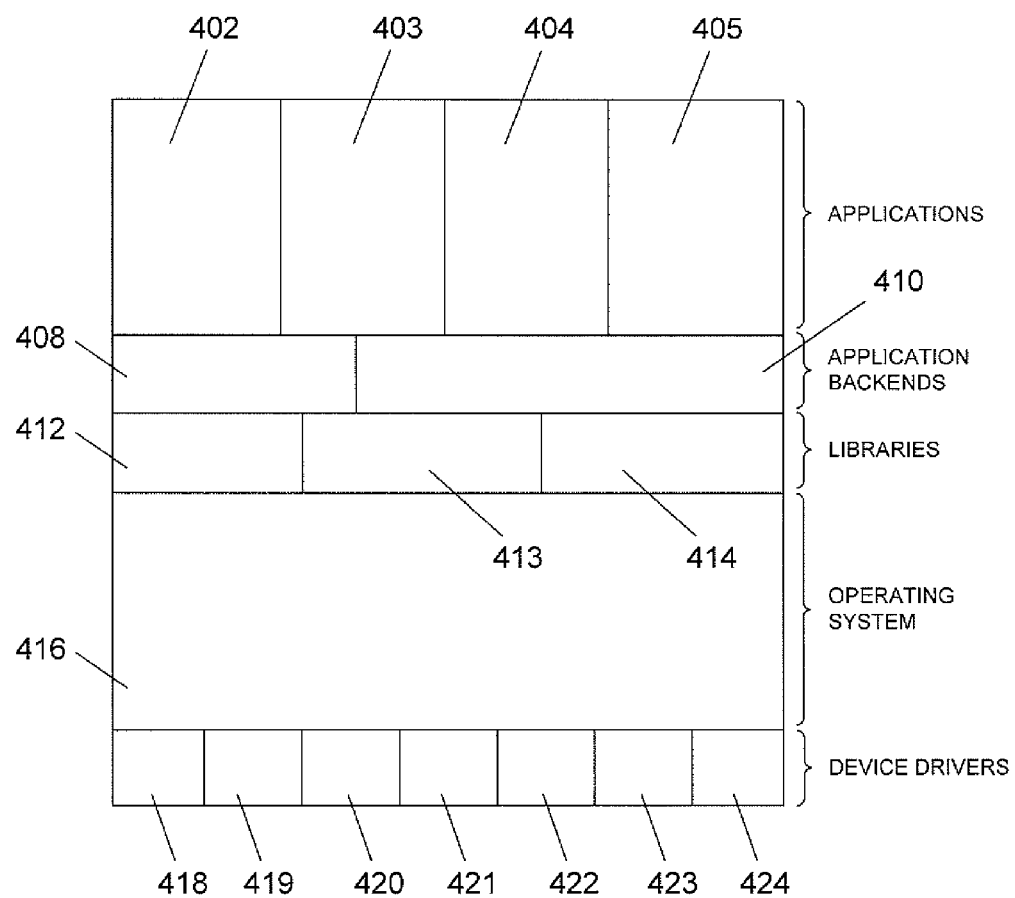
FIG. 4 illustrates the various different software programs and modules that may be resident within a computer system at any given point in time.

FIG. 4 illustrates the various different software programs and modules that may be resident within a computer system at any given point in time. There may be many tens of application programs 402-405 concurrently executing within a computer system, each of which may, in turn, comprise a single process or many tens to hundreds of processes and threads. Certain types of application programs may be associated with backend routines 408 and 410 that continuously execute in order to carry out various tasks on behalf of application processes. For example, an email application that displays an email interface and provides for creation and editing of emails may be associated with an email backend process or processes that monitor communications interfaces for incoming email, queue emails for sending to remote computers, automatically retry failed attempts to send email, and carry out additional tasks on behalf of the email program. In addition, there may be a number of libraries containing executables that are common to multiple applications and application backbends 412-414. The applications, application backend programs, and library routines all execute above an execution environment created by an operating system 416, often a very large program with multiple processes and threads that concurrently execute to provide an interface to hardware components of the computer system. Operating systems, in turn, generally include lower-level routines, such as device drivers 418-424, that provide interfaces to various hardware components, including various types of controllers that control internal components and external peripheral components. One aspect of the full runtime state of a computer system is the set of all currently executing processes and threads associated with each of the currently executing application programs, application backend programs, operating system, and operating system components, including the values in various processor registers associated with the last point in time at which the process or thread executed.

Figure 5:
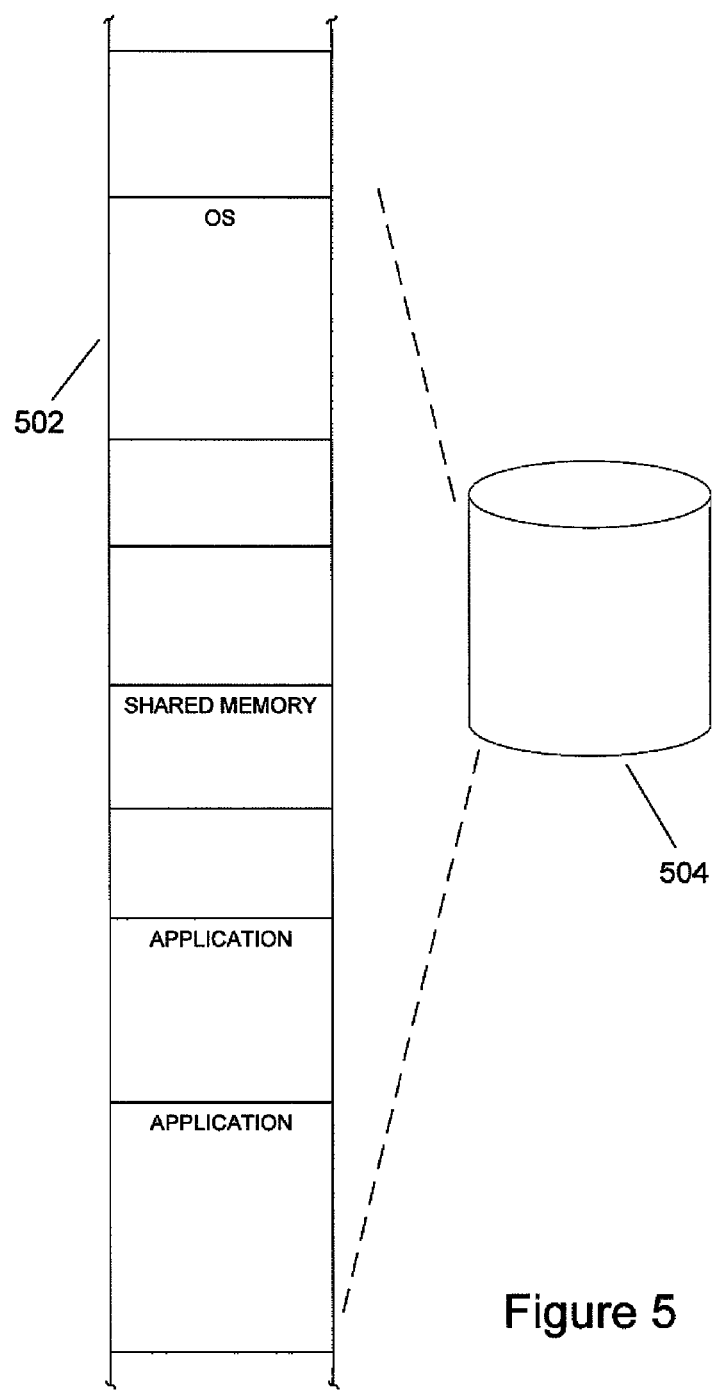
FIG. 5 illustrates the memory of a computer system.

FIG. 5 illustrates the memory of a computer system. The memory 502 can be thought of as a very long list of memory units, such as words, each with a unique address, which form a large linear address space that is, in part, contained in physical electronic memory and, in part, stored on one or more mass-storage devices 504. Physical, electronic memory is generally much smaller than the virtual memory provided by the operating system of a computer system. Data is continuously shuffled from mass-storage devices to physical memory and from physical memory to mass-storage devices in order to simulate a large virtual-memory address space for both the operating system and for application programs. One aspect of the full runtime state of a computer system is all of the data currently resident in physical, electronic data, all data resident within mass-storage devices that support the virtual memory, and the current state of all files within the file system. On modern personal computers, the runtime state of the virtual memory of the computer system may comprise tens of gigabytes of data, or even greater amounts of data.

Figure 6:
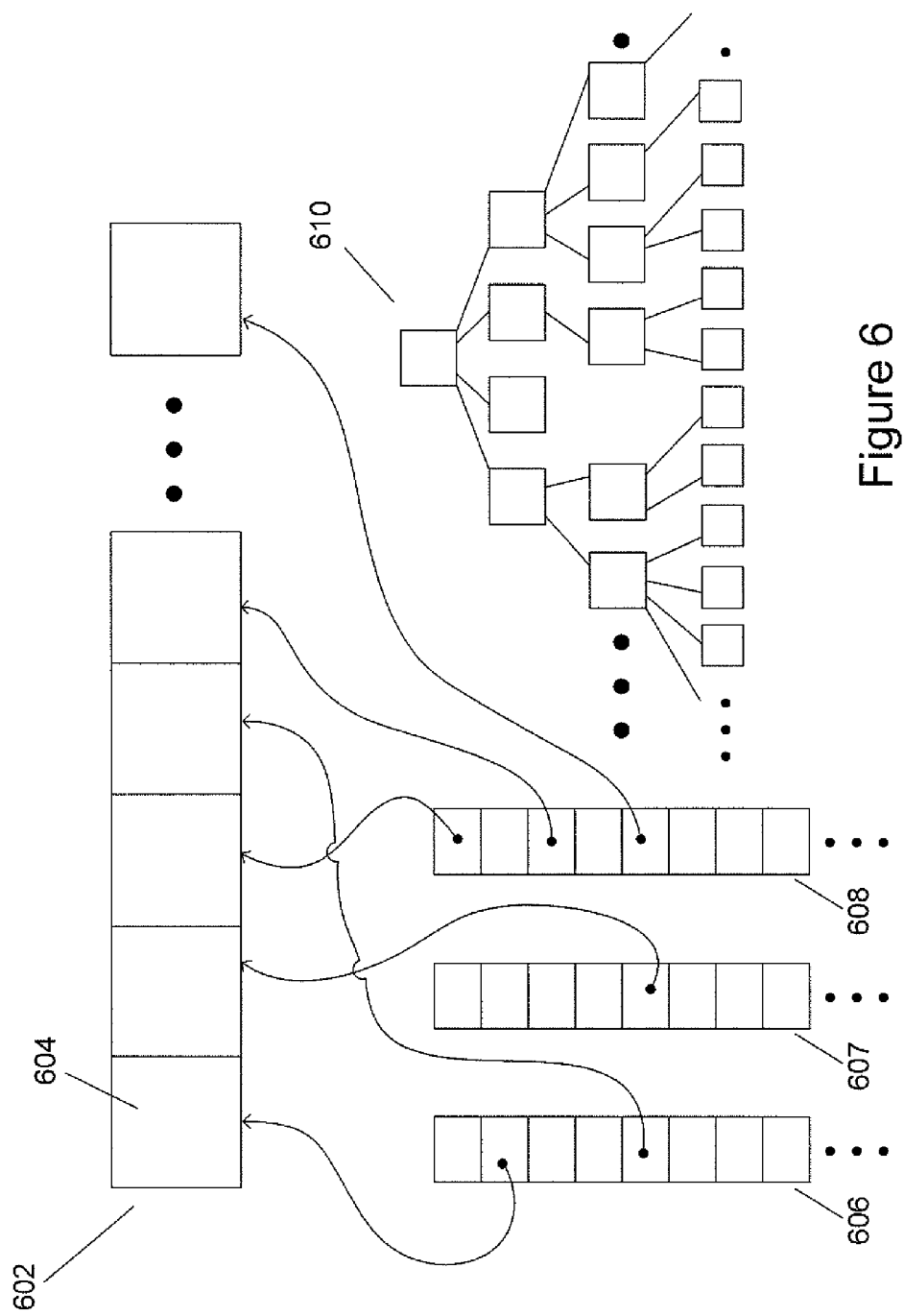
FIG. 6 illustrates certain of the data structures employed by an operating system to provide a software execution environment.

FIG. 6 illustrates certain of the data structures employed by an operating system to provide a software execution environment. An operating system generally maintains a list of process-control blocks 602, each process-control block, such as process-control block 604, containing various fields that describe the current execution state of a process. As processes are executed, suspended, and queued to various wait queues, the state of the processes change, as reflected in the values of fields within the process control block. Generally, an operating system may manage a number of different queues 606-608 that contain references to process-control blocks and represent queues of processes waiting for events or resources. An operating system maintains large, complicated hierarchical structures 610 to represent the open files and directories of a file system. Operating systems maintain many other, similar data structures, for managing the very complex and dynamic execution-environment state of the computer system, including complex data structures that reflect distribution of pending tasks in a multi-processor computer system. All of these structures, and the data contained within these data structures, are an important part of the runtime state of a computer system, in addition to the contents of memory, discussed with reference to FIG. 5, and the identities and hierarchical relationships between all of the currently executing programs and routines, as discussed with reference to FIG. 4.

Figure 7:
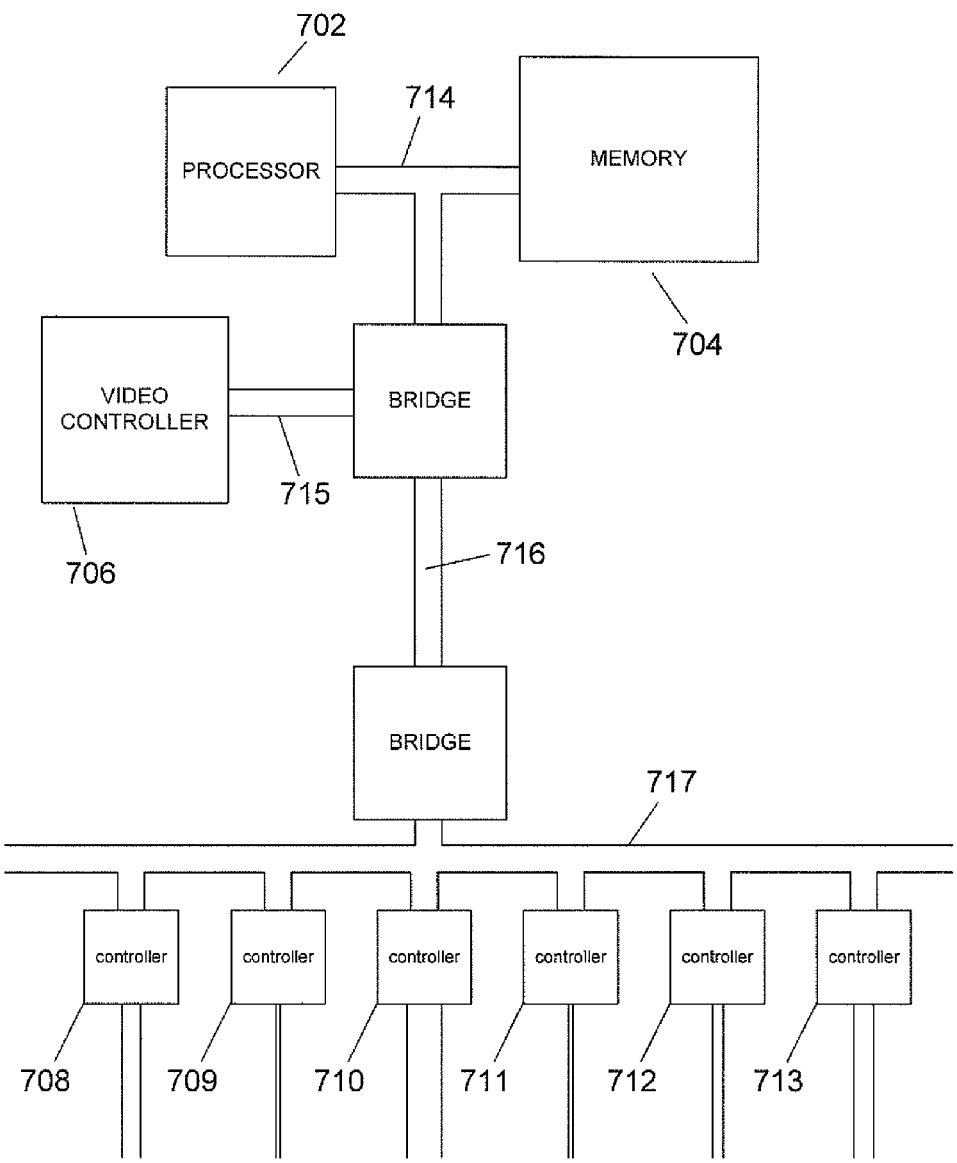
FIG. 7 shows a simplified diagram of the major internal electronic components of a computer system.

FIG. 7 shows a simplified diagram of the major internal electronic components of a computer system. These components include one or more processors 702, various types of electronic memory 704, a video controller 706, a number of additional device controllers 708-713, and a variety of different internal communications media 714-717 that interconnect the various internal components. The operation of the electronic components are generally expressed as state-transition diagrams, with the current state of an electronic component represented by the contents of various electronic memory registers, latches, and other state-storing subcomponents within the component. Ultimately, the current runtime state of a computer system includes the electronic states of all of these internal components.

As can be hopefully appreciated from the above discussion with reference to FIGS. 4-7, there is really no way that the full runtime state of a computer system can be captured at any given instant in time. To capture the run-state of a computer system would involved determining the states of both the electrical and software components of the computer system, but the information required to characterize the states of all of these components is voluminous, and the time required to determine and store this information far exceeds the time scales at which the internal states of the electrical and software components change. At best, a partial runtime state might possibly be captured by suspending, as much as possible, operation of various components and storing a snapshot of the contents of registers and virtual memory. In fact, there are various state-capturing tools, including tools employed for debugging computer programs and operating systems, that attempt to capture the state of a computer system in this fashion. However, as discussed above, even for capturing a partial state in this manner, the snapshot often contains gigabytes of data, and requires minutes or hours for extraction, assembly, and storage. Obviously, runtime-state capture and storage at this level would not provide the type of state-save-and-restore tool described above with reference to FIGS. 1-3.

Embodiments of the present invention take a much different approach to runtime-state capture, encoding, and storage than the partial computer-system-state capture described in the preceding paragraph. First, the full, complete runtime state of a computer system is generally not needed in order to provide the application-level save-and-restore tool needed by a computer user. The user generally does not need to restore the exact, instantaneous runtime state of the computer system, but, instead, wishes to recreate the high-level, application-program environment visible to the user as the contents of the display monitor, shown in FIG. 1. In other words, the user is chiefly concerned with saving a list of the application programs currently executing, at a particular point in time, along with the positions and content of open windows associated with those applications and other open resources associated with the applications, including open file-system files, sockets, and other such resources. An application-level runtime state can be captured in an extremely time-efficient and data-storage-efficient manner, as discussed in greater detail below. Furthermore, a user does not need, in general, a precise restoration of the states of all application programs at the time that the user executes a snapshot of the application-level runtime state of the computer system, but instead can often tolerate a rather large degree of imprecision in application-state restoration. As one example, if, at the time of a snapshot, the user is editing a text file using a text-editor application, with the cursor positioned on the fifth line of the $25^{th}$ page of the text file, a restoration process that restores the application state approximately, so that instead of positioning the cursor on the fifth line of the $25^{th}$ page of the document, the cursor is instead placed on the first line of the first page of the document might nonetheless provide an adequate and useful application-level runtime-state, since the user can quite quickly and efficiently navigate to the proper line of the text file using application commands. In fact, restoration of a text editor so that the cursor is correctly positioned at the point to which the cursor is positioned at the time of the snapshot is relatively straightforward, but, in other cases, restoring the exact, precise state of an application from a stored snapshot may not be possible. For example, in those systems in which the snapshot operation does not save copies of the text files currently being edited by a text-editor application, the text file may be significantly altered, or even deleted, during the time that elapses between a snapshot operation and restoration of the runtime state of the computer system using the stored snapshot. In this case, the restoration process cannot restore the precise runtime state of the application program, since the underlying text file has either changed or is no longer available. Even in that case, however, restoring the application-level runtime state of the computer system to a best-possible extent may still provide enormous benefit to a computer user.

To summarize, embodiments of the present invention are directed to taking application-level runtime snapshots, rather than full runtime snapshots, of computer systems, and restoration operations that attempt to reproduce the application-level runtime state of each application listed in a snapshot as best as possible using available operating-system tools and application interfaces. In addition, as discussed in greater detail below, embodiments of the present invention store screenshots of the windows and interfaces displayed on the display device of a computer system at the time of a snapshot in order to facilitate a more precise restoration of the application-level runtime state of a computer system by a computer user using application interface commands and operating-system commands following the approximate restoration of an application-level runtime state from an application-level-runtime-state snapshot by embodiments of the present invention. By saving and restoring application-level runtime computer-system states, rather than full runtime states, and by relaxing the precision to which application-level states are restored, the application-level runtime-state save-and-restore procedures run quickly and consume comparatively very little data-storage space. In many embodiments of the present invention, the level of precision of restoration and the amount of data stored for each snapshot can be controlled by user-specified parameters. In addition, the frequency of automated application-level-runtime-state snapshots may also be controlled by user input to a snapshot-control interface.

Figure 8:
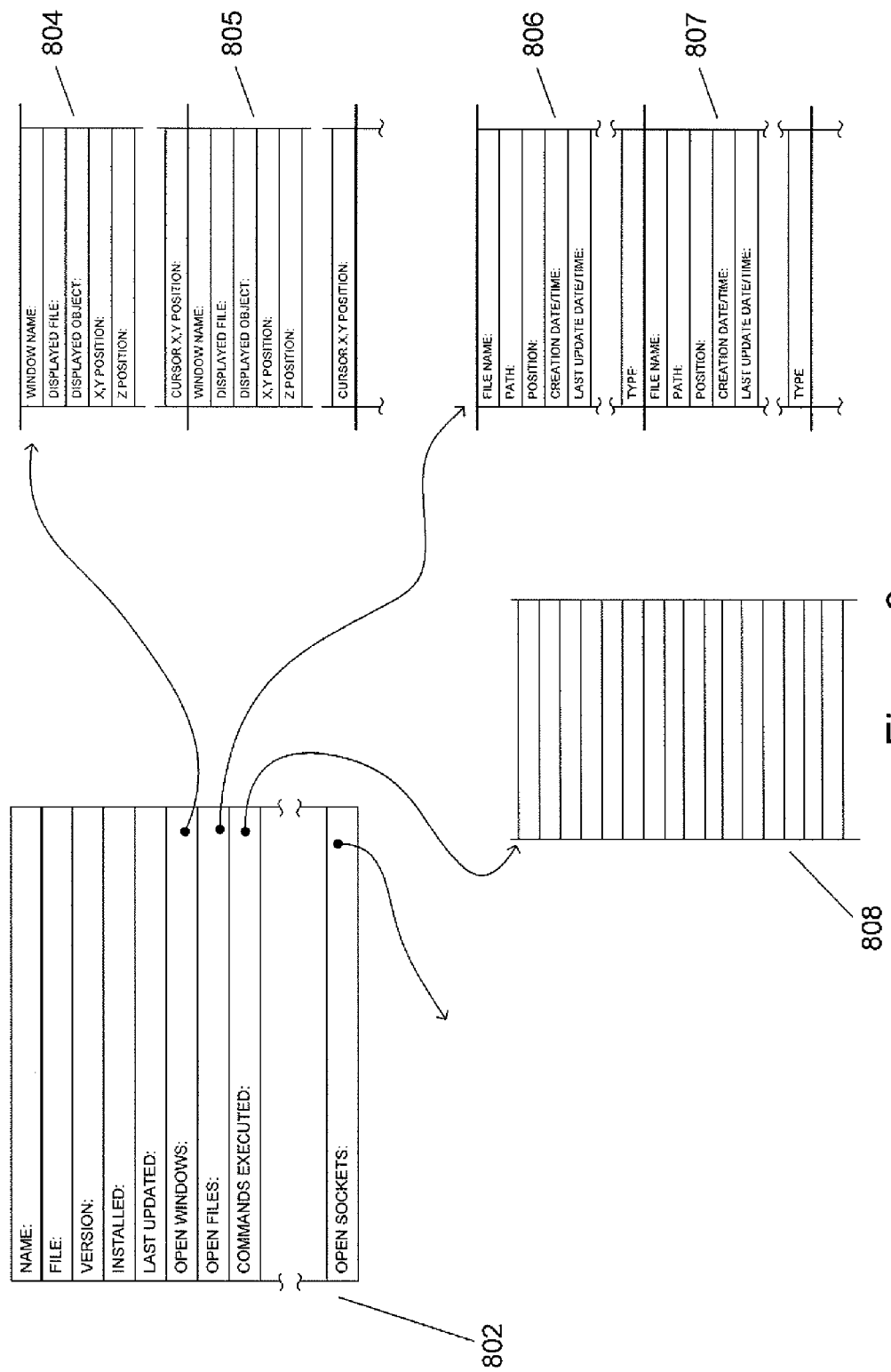
FIGS. 8-9 illustrate the information stored, and data structures used to store the information, for each currently executing application program when an application-level-runtime-state snapshot is taken according to embodiments of the present invention.
Figure 9:
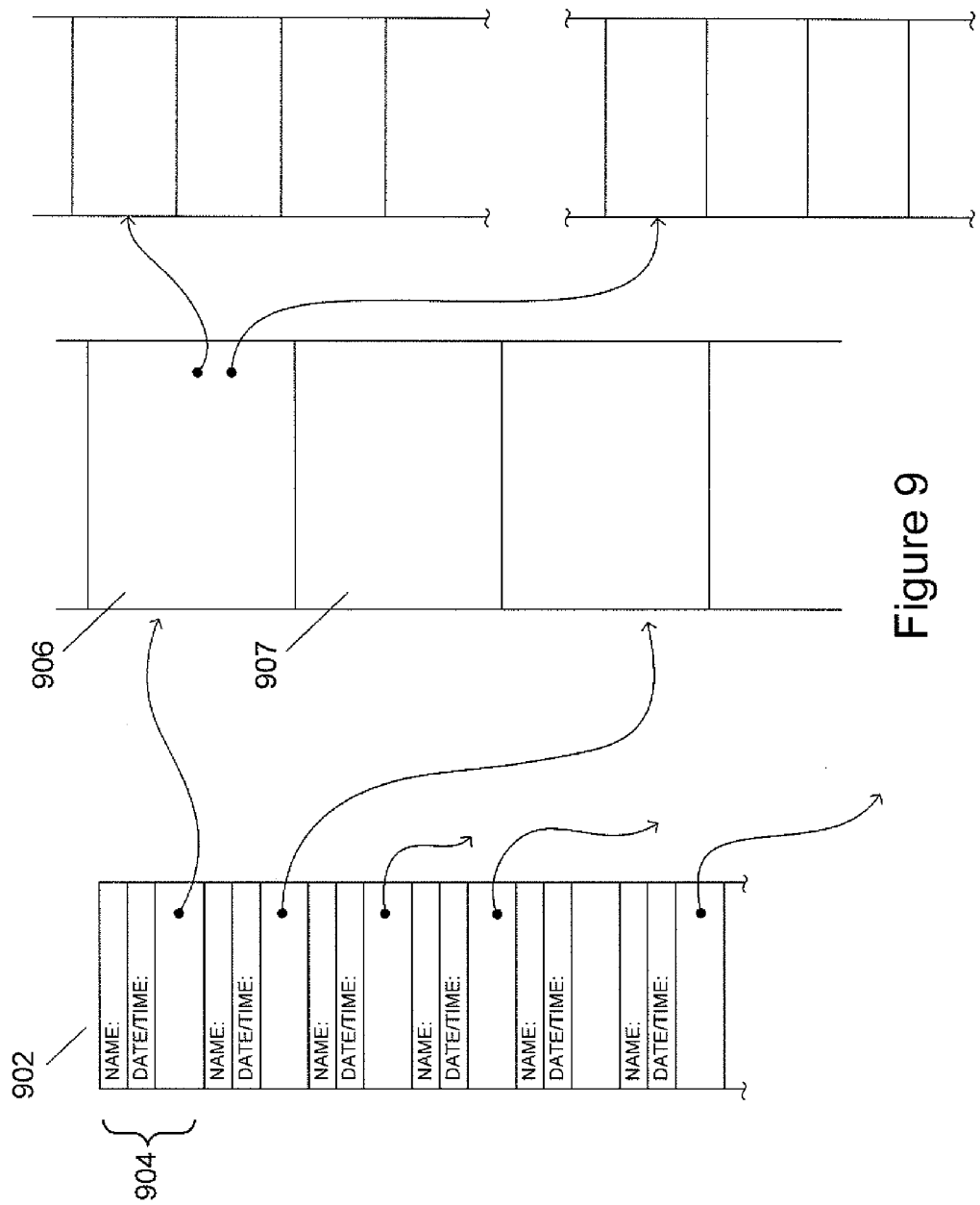

FIGS. 8-9 illustrate the information stored, and data structures used to store the information, for each currently executing application program when an application-level-runtime-state snapshot is taken according to embodiments of the present invention. As shown in FIG. 8, for each currently executing application program, state information for that application program is stored in an application record 802. The application record references additional records 804 and 805, each of which describes an open window associated with the executing application, additional records 806 and 807, each of which describes an open file associated with an executing application, and, when possible, a list of commands 808 executed on behalf of a user by the executing application program since the application program was launched or since some save point or synchronization point last reached by the application program. Additional types of open resources associated with an application may be described by additional types of open-resource records. The application record 802 may store a name, executable filename, and file-system path, a version number, installation date and time, and a last-update date and time for the application, as shown in FIG. 8, as well as many additional fields; including and ID, a plug-in ID, a reference to a thumbnail description and/or image, and many other types of data.

Each open-window record, such as open-window record 804, may store a window name, a reference to a file or object, a representation of which is currently displayed in the window, the x,y position and current size of the window on the display-monitor screen, the z-position of the window with respect to other windows displayed on the display monitor, the x,y position of a cursor associated with the window, and many other types of information useful in restoring a window by a restoration procedure.

Each open-file record, such as open-file record 806, may contain the name of a file, the file-system path of the file, a current active position within the file, creation date and time of the file, last update date and time, an indication of the file type, and many other types of information that facilitate restoration of an open file associated with a restored application program.

The commands stored in a command record, such as command record 808, may assist the restoration process to restore the exact state of an executing application by re-issuing the commands, following launching of the application. For example, a text-editor application may be launched to an initial state, and then saved commands may be sequentially re-issued to the text-editor application to open particular documents and carry out those editing tasks that had occurred prior to the application-level-runtime-state snapshot. Of course, many considerations are involved in re-executing application commands. For example, when files are no longer available, commands directed to operations on unavailable files should not be issued, or, if issued, errors returned as a result of re-issuing the commands need to be handled in an appropriate fashion.

FIG. 9 shows a data structure that stores a number of application-level-runtime-state snapshots. The highest-level data structure 902 comprises a list of snapshot records, such as snapshot record 904. Each snapshot record contains information about the snapshot, including a name, a date and time at which the snapshot was taken, a date and time at which the snapshot will expire, and other useful information, including a size, user name, user domain, alphanumeric description, machine name, machine domain, thumbnail graphic, an indication of whether or not the snapshot should be stored without possibility of automated deletion, to make room for subsequent snapshots, and other such types of information that may be useful in storing, restoring, and managing application-level-runtime-state snapshots. Each snapshot record, such as snapshot record 904, references a list of application records, such as application records 906 and 907 referenced by snapshot record 904. As discussed with reference to FIG. 8, each application record, in turn, may reference various lists of records that describe open windows and other open resources associated with an application. Lists of application records may be linked together by internal references to form link lists, to facilitate allocation, deletion, and reference to the application records by the application-level-runtime-state save and application-level-runtime-state restore procedures that represent embodiments of the present invention.

The detailed contents of snapshot records, application records, and open-resource records may vary from embodiment to embodiment. In certain heavier-weight embodiments of the present invention, the actual files and other entities and objects on which applications operate, or with which applications may be associated, may also be stored as part of a snapshot. For example, the text documents associated with an executing text-editor application may be saved and stored, by the snapshot procedure, so that the text-editor application may be precisely restored at a later time. In more lightweight embodiments of the present invention, the files and other objects and entities associated with executing applications may not be stored, so that, when these files, entities, and other objects are altered or deleted following a snapshot, the restoration process cannot precisely restore the applications associated with them.

Figure 10A:
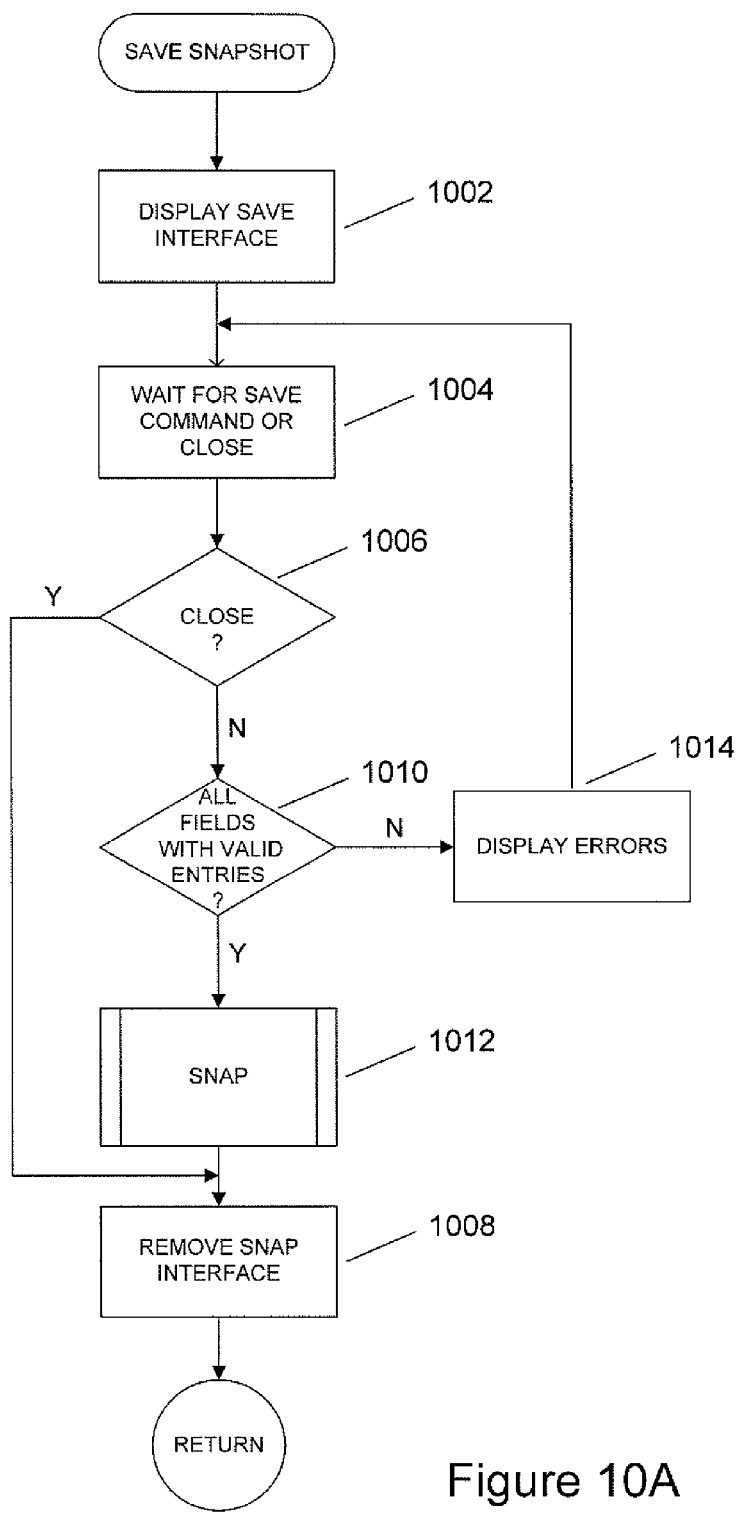
FIGS. 10A-C provide control-flow diagrams for the application-level-runtime-state snapshot operation that represents one embodiment of the present invention.
Figure 10B:
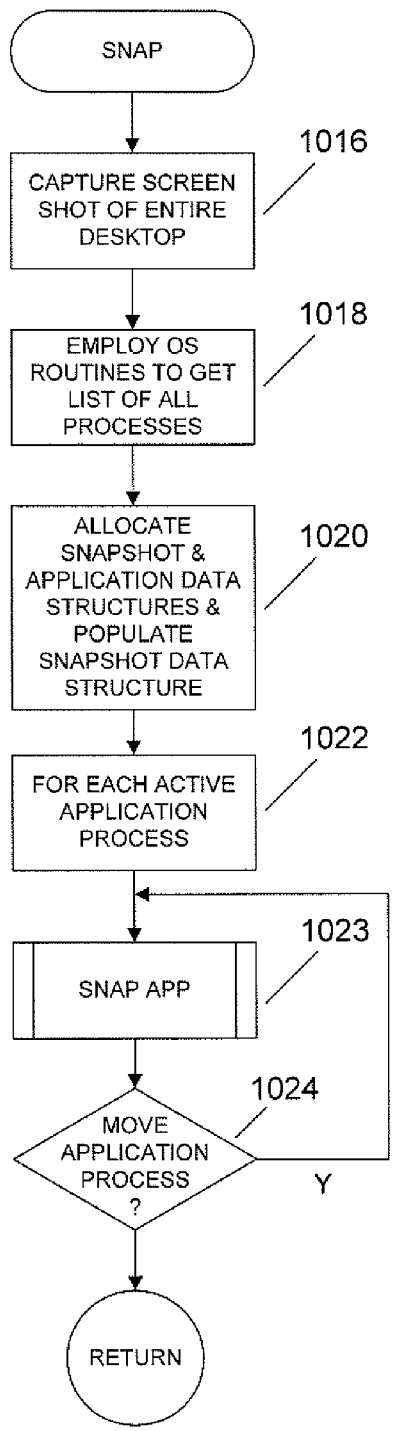
Figure 10C:
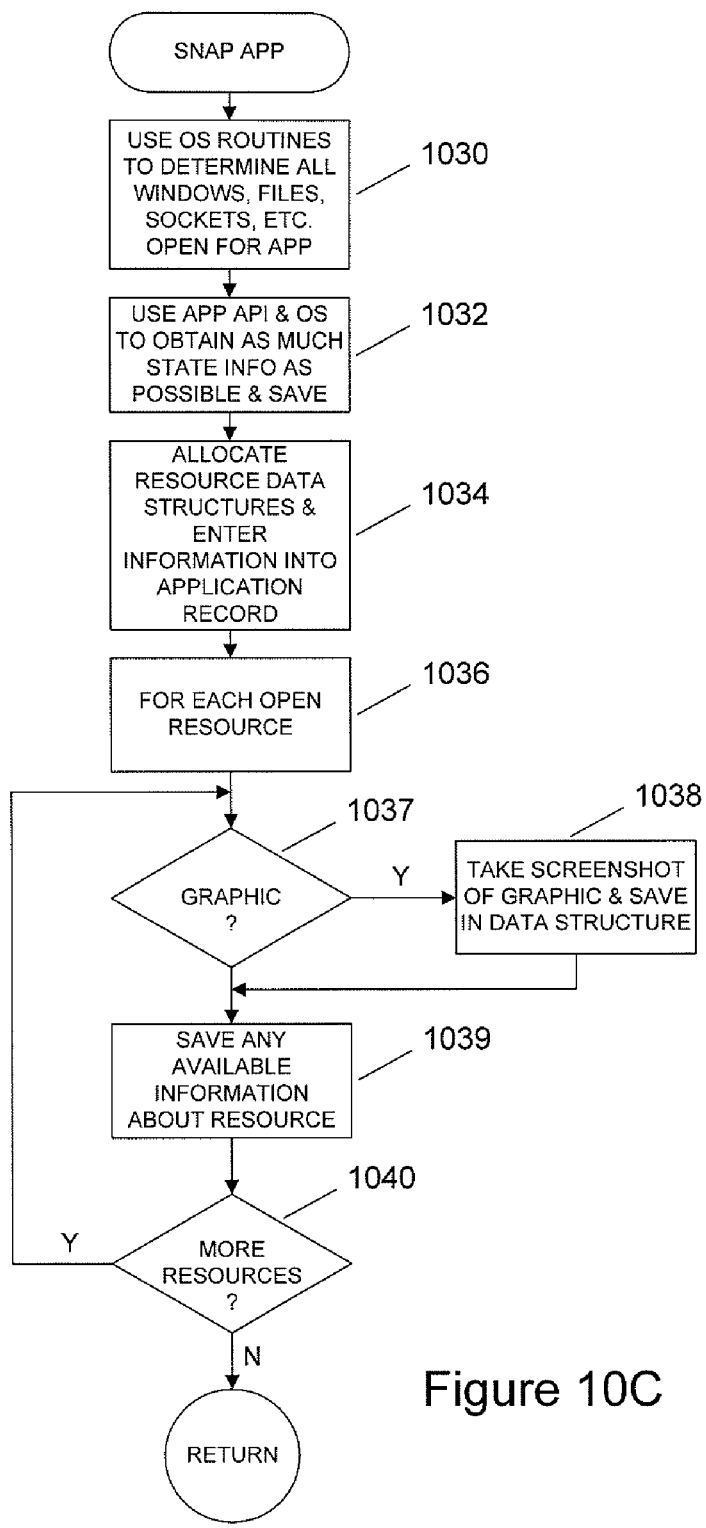

FIGS. 10A-C provide control-flow diagrams for the application-level-runtime-state snapshot operation that represents one embodiment of the present invention. FIG. 10A provides the highest-level control-flow diagram for the snapshot operation. In F*igure* 1002, the routine "save snapshot" displays a snapshot-saving interface to a user to collect information from the user for launching a snapshot operation. Once the interface is displayed, in step 1002, the "save snapshot" routine waits, in step 1004, for the user to enter a command through the save-snapshot interface. If the user chooses to close the interface, and not to undertake a snapshot operation, as determined in step 1006, then, in step 1008, the save-snapshot interface displayed in step 1002 is removed from the display and the routine finishes. Otherwise, if the user has entered a save-snapshot command, then, when all the fields of the save-snapshot interface contain valid information entered by the user, as determined in step 1010, the routine "snap" is called in step 1012 to execute the snapshot operation. If the user has entered incomplete or incorrect information, as determined in step 1010, then the routine "save snapshot" displays indications of the errors or missing information, in step 1014, and then returns to step 1004 to wait for proper input.

Of course, more complex embodiments of the present invention may involve more complex control flows, including very specific data entry and data-verification-related control flows. In the interest of brevity and generality, those details, straightforwardly implemented by software engineers, are omitted from the current figures and discussion.

FIG. 10B provides a control-flow diagram for the routine "snap" called in step 1012 of FIG. 10A. In step 1016, the routine "snap" captures a screenshot of the entire desktop displayed on the display device of a user's computer system. This screenshot may be used in a thumbnail graphical description of the snapshot and may also be used to facilitate the restoration process. In step 1018, the routine "snap" employs operating system routines and other available mechanisms to create a list of all currently executing application processes within the computer system. Moreover, when a particular application executes as multiple processes, the multiple processes are aggregated together into a group of processes associated with the application. Then, in step 1020, a snapshot record is allocated and application records are allocated for all of the processes. As many fields within the snapshot record as possible are initialized with values obtained from the snapshot interface, with other field values determined and entered as the snapshot proceeds. In the for-loop of steps 1022-1024, the routine "snap app" is called for each application in order to store sufficient information as part of the stored snapshot to allow for restoration of the current application-level runtime state of each application.

FIG. 10C provides a control-flow diagram for the routine "snap app." In step 1030, the routine "snap app" uses available operating system routines and application-programming-interface ("API") routines to determine all of the open windows, open files, and other open resources associated with a particular executing application. In step 1032, the routine "snap app" uses operating system routines and API routines to obtain as much state information as possible for the executing application for which the routine "snap app" was called, in step 1023 of FIG. 10B, and saves that information into the application record. Next, in step 1034, the routine "snap app" allocates window records and other resource records for describing all the open windows and other open resources associated with the application and then enters references to these data structures into the application record. Then, in the for-loop of steps 1036-1040, the routine "snap app" considers each open window and other open resource and collects as much information about the state of each open window and other open resource as possible and saves that information into the corresponding open-window or other open-resource record. In the case of open windows, and in the case of other resources with graphical representations, as determined in step 1037, a screenshot of the graphical representation of the window or other object is taken and stored, and a reference to the screenshot is saved in the open-resource data structure.

Figure 11A:
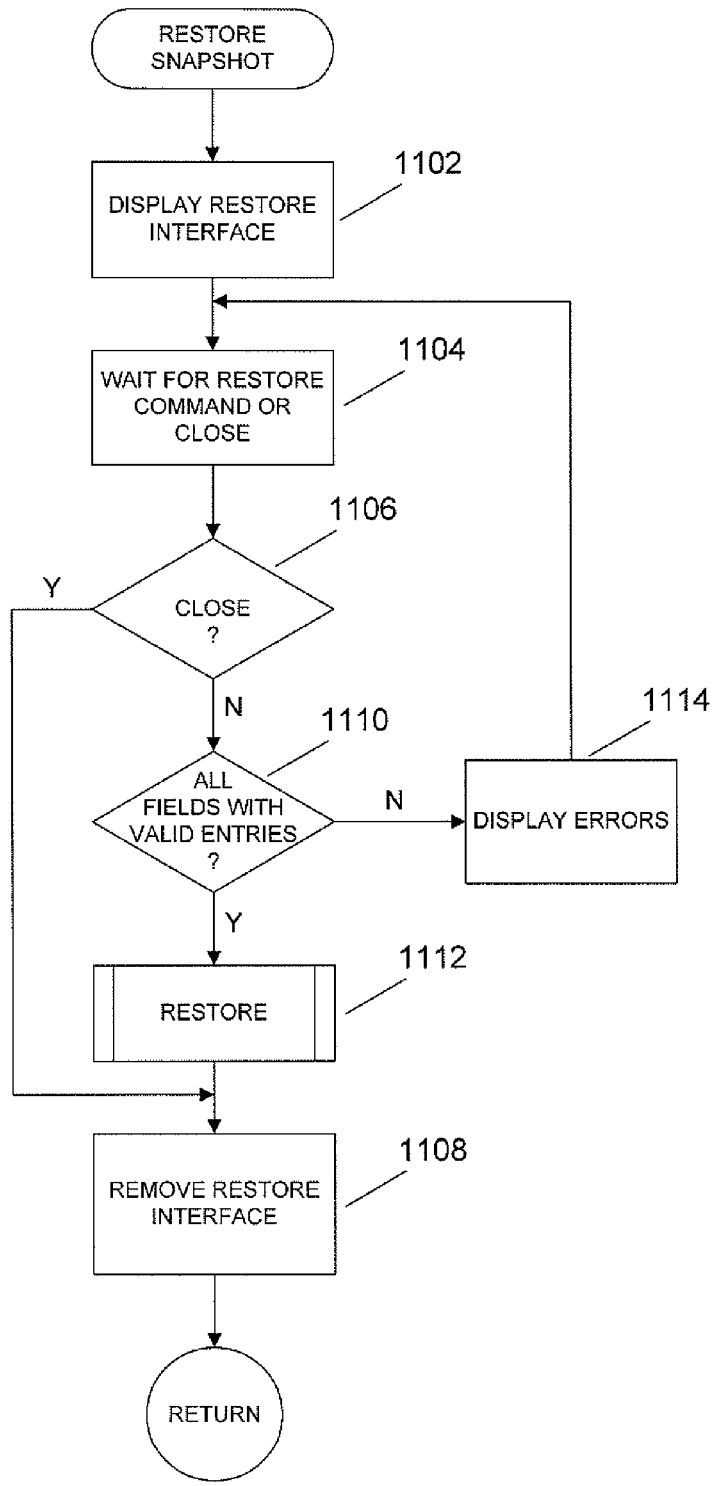
FIGS. 11A-D illustrate the restore-snapshot operation that represents one embodiment of the present invention.

FIGS. 11A-D illustrate the restore-snapshot operation that represents one embodiment of the present invention. FIG. 11A provides a control-flow diagram for the highest-level routine "restore snapshot." In step 1102, a restore-snapshot graphical interface is displayed to a user. In step 1104, the routine "restore snapshot" waits for the user to enter a command via the displayed restore-snapshot interface. If the user wishes to close the interface without restoring a snapshot, as determined in step 1106, then the restore-snapshot interface is removed, in step 1108. Otherwise, if all the fields have been filled in with valid information, as determined in step 1110, then the routine "restore" is called in step 1112. Otherwise, the routine "restore snapshot" displays errors and indications of missing information, in step 1114, before returning to step 1104 to wait for the user to supply necessary information to launch a restore operation.

Figure 11B:
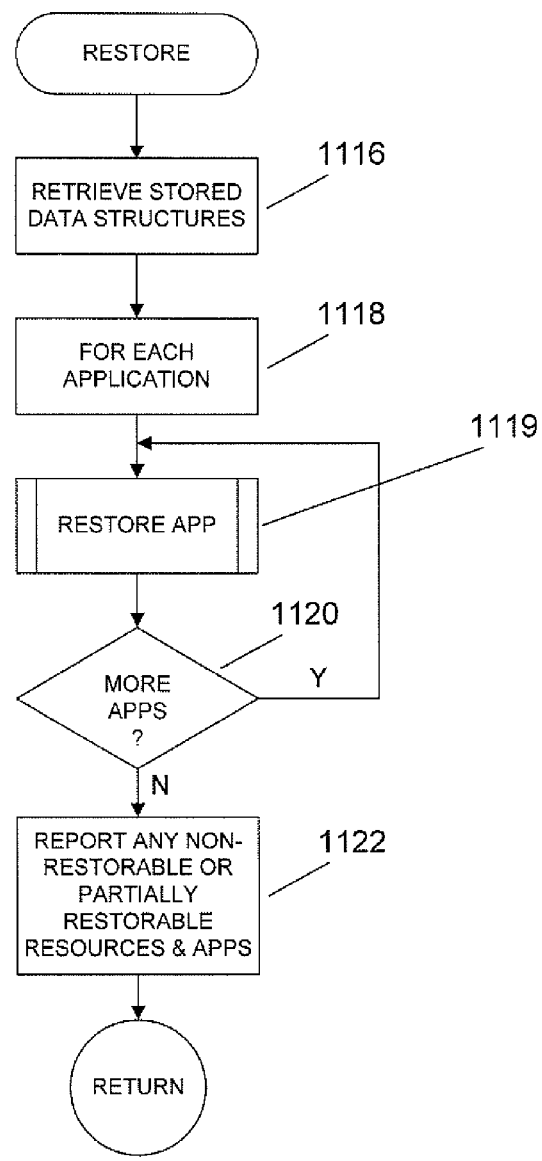

FIG. 11B provides a control-flow diagram for the routine "restore," called in step 1112 of FIG. 11A, that represents one embodiment of the present invention. In step 1116, the routine "restore" retrieves all of the stored data structures containing state information for a snapshot identified by the user for restoration. In the for-loop of steps 1118-1120, the routine "restore" calls the routine "restore app" for each application record in order to restore all applications that were executing at the time that the snapshot was made. In step 1122, the routine "restore" reports, by way of a graphical user interface or other means of communicating information to a user, any of the applications or application-associated windows or other resources that failed to be restored for any of various reasons. Using the above-mentioned example, when text files are not saved as part of the snapshot process, it may be impossible to find the text file that was being edited by a text-editor application at the time the snapshot was made. In that case, the text editor is opened, but an indication is returned to the user that the text file that was being edited cannot be found.

Figure 11C:
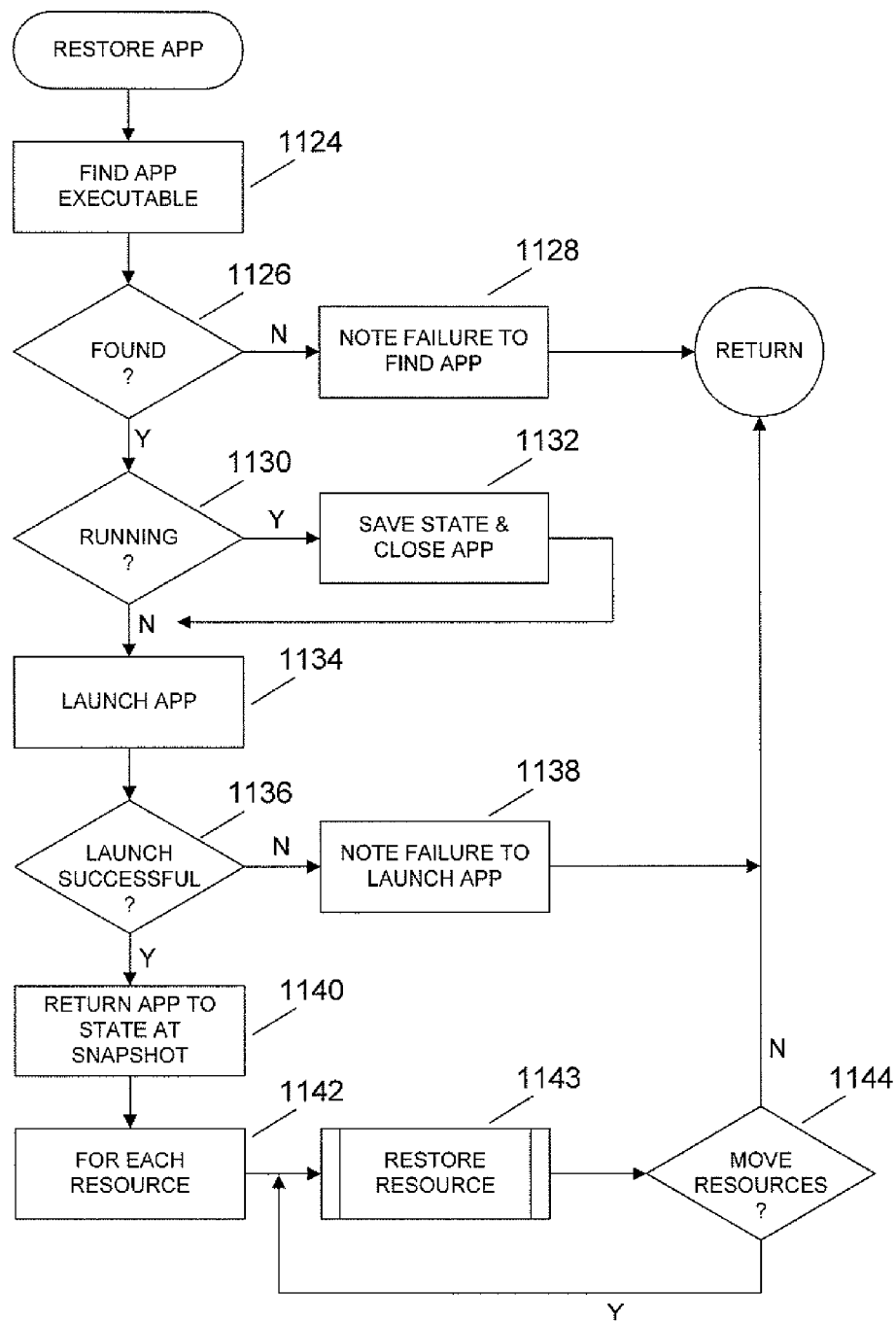

FIG. 11C provides a control-flow diagram for the routine "restore app" called in step 1119 of FIG. 11B. In step 1124, the routine "restore app" locates the executable for the application. If the executable cannot be found, as determined in step 1126, then failure to find the application is noted, in step 1128 for subsequent reporting to the user, and the routine "restore app" returns. Otherwise, if the application is already running, as determined in step 1130, then, in certain embodiments of the present invention, the current state of the application is saved, as far as possible, via the application API and the application is closed, in step 1132, to prevent the restoration process from deleteriously impacting currently executing applications. In certain embodiments of the present invention, this step would be unnecessary, since the user would be required to close all currently executing applications before undertaking an application-level runtime-state-restoration process. In other cases, the restoration process itself closes all currently executing applications as a first step. In yet additional embodiments of the present invention, currently executing applications are allowed to remain, in the background, while the restoration process restores the applications that were executing at the time the snapshot was made. User-specified parameters may allow a user, in various embodiments of the present invention, to control when and if currently executing applications are closed prior to, or during, an application-level-runtime-state restoration. In step 1134, the application for which the routine "restore app" was called, in step 1119 of FIG. 11B, is launched. If the launch is not successful, then failure to launch the application is noted, in step 1138, for subsequent reporting to the user and the routine "restore app" returns. Otherwise, in step 1140, the routine "restore app" restores the application, as far as possible, to the state at which the application was executing at the time of the snapshot. As discussed above, in certain cases, a list of commands that had been executed by the user up to the time of the snapshot is retrieved from the stored data structures and re-executed in order to bring the application back to the state at which it was executing prior to the snapshot. In other cases, the application is launched, with responsibility for fine-granularity application-state restoration lying with the user. Intermediate levels of application-state restoration are also possible in alternative embodiments of the current invention. Then, in the for-loop of steps 1142-1144, all of the open resources associated with the application and described by open-resource records linked to the application record are restored via a call to the routine "restore resource" in step 1143.

Figure 11D:
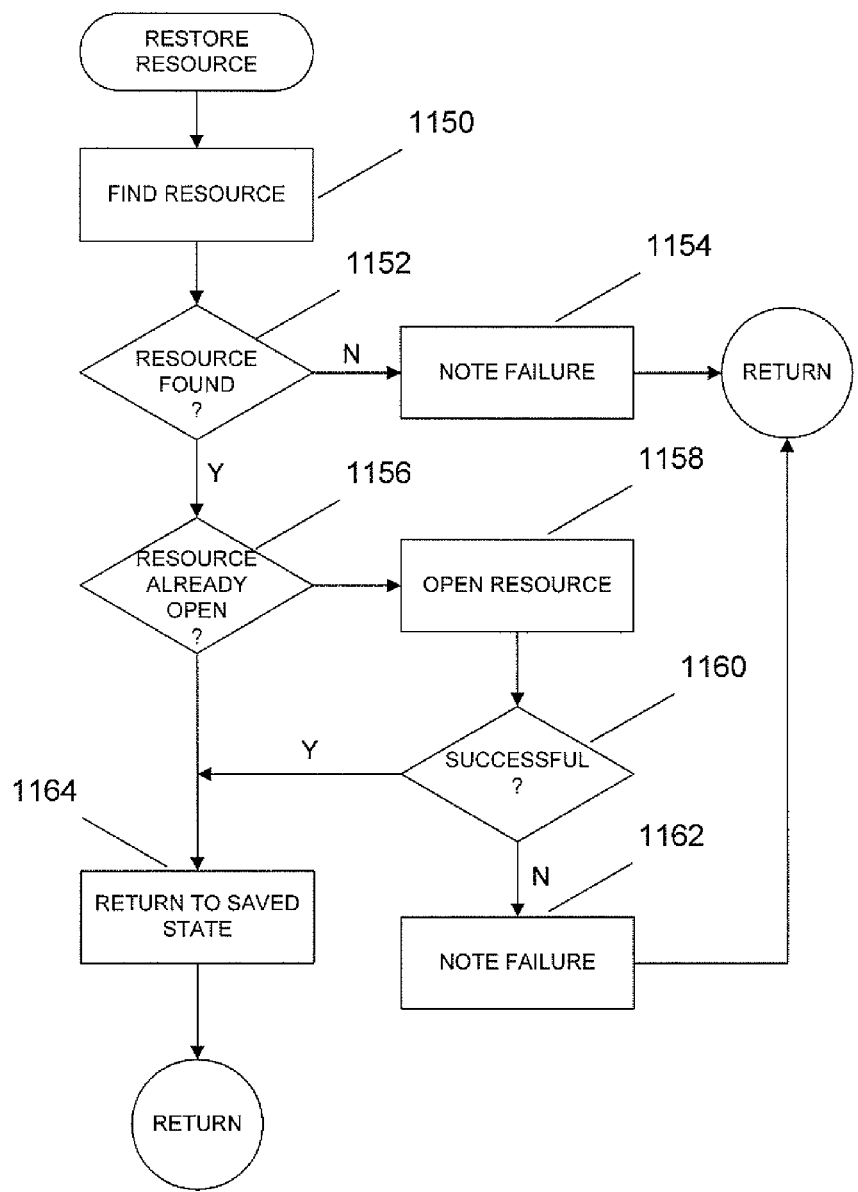

FIG. 11D provides a control-flow diagram for the routine "restore resource" called in step 1143 of FIG. 11C. In step 1150, the routine "restore resource" locates the resource and determines how to open or restore the resource. If the resource is hot found, or no method is determined by which the resource can be restored, then a failure is noted in step 1154 for subsequent reporting to the user. Otherwise, if the resource is not already open, as determined in step 1156, the resource is opened in step 1158. If the resource cannot be successively opened, as determined in step 1160, then the failure to open the resource is noted, in step 1162, and any other possible error-recovery mechanisms are invoked. Otherwise, in step 1164, the routine "restore resource" applies any of various resource-specific commands or operations that may be used to restore the resource to the state of the resource at the time of the snapshot. For example, the routine "restore resource" may seek for a location in a text file at which the executing application had positioned the text file prior to the snapshot. As another example, a window may be sized and positioned as it was at the time of the snapshot, and the contents displayed in the window at the time of the snapshot recovered as far as possible. In alternate embodiments of the present invention, when the resource is already open, as determined in step 1156, and when the resource is not shared with other applications that were executing at the time of the snapshot, the state of the resource may be saved and the resource closed, prior to again opening the resource in step 1158. These levels of complexity are implementation-specific and embodiment-specific, and require careful consideration of all possible side effects and potential conflicts concerning shared resourced and different versions of resources.

The application-level runtime-state save-and-restore utilities that represent embodiments of the present invention also generally include a number of routines that implement snapshot management functionality. This functionality allows a user to manage saved snapshots and locate particular snapshots for restoration, as well as to export snapshots to remote computers, archive snapshots, delete snapshots, and pin snapshots to prevent their automatic deletion. This functionality is similar to that of other data-management systems, and can be discerned from representations of the graphical user interface, discussed below. In an alternative embodiment, rather than pinning snapshots, an expiration date associated with a snapshot can be set to a particular value to prevent the snapshot from expiring, in which case a padlock icon may be used to visually indicate to a user that the snapshot is protected from deletion.

In alternative embodiments of the present invention, multiple, different snapshots may be opened together, in a single operation, or opened cumulatively, using a series of snapshot-open commands. In this case, the runtime-state save-and-restore utility ensures that no duplicative or redundant application invocations occur, and that only a single instance of each open window and open resource among the open windows and open resources specified by the multiple snapshots is reopened during a cumulative, multiple-snapshot restore operation. A multiple snapshot restore operation can result in a new computer-system state that represents a combination of states stored in the multiple snapshots. In similar fashion, snapshot-editing tools allow a user, in certain embodiments of the present invention, to edit snapshots in order to create application-level-runtime states that were not captured at a particular time, but are, instead, composite snapshots that combine multiple snapshots or that, in fact, when restored, result in new application-level-runtime states that were not saved in a snapshot operation. In certain embodiments of the present invention, the restore operation provides significant flexibility in the restoration process. A user may wish, for example, to restore only a subset of the open applications, open windows, and open resources saved in the snapshot, or may wish to manually launch certain of the applications and open resources, and then invoke automated application restoral for remaining applications or open resources. The application-level-runtime state save-and-restore utility that represents an embodiment of the present invention may provide an additional interface to allow users to specify variations of how an application is restored. Furthermore, a snapshot can be saved, by one user, and restored by a second user into that user's computing domain. Snapshots can thus provide a means by which users can save and share application-levelruntime states among themselves. Application-level-runtime-state capture and storage in snapshots may represent computer-workspace states, allowing a user to invoke all applications and opening of associated resources for particular tasks using a single snapshot-restore command.

Figure 12A:
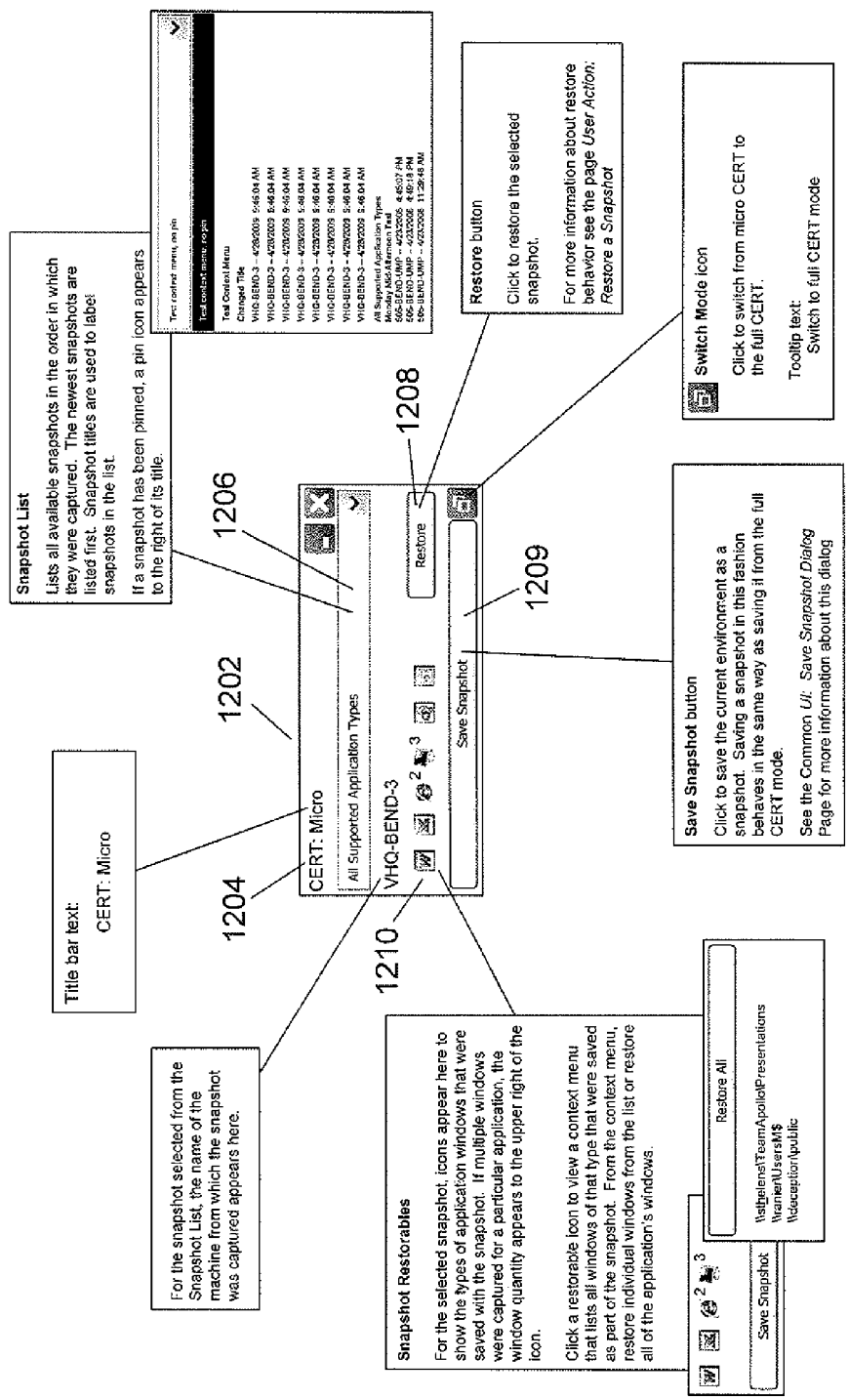
FIGS. 12A-M illustrate aspects of the graphical user interface for an application-level-runtime-state save-and-restore utility that represents one embodiment of the present invention.

FIGS. 12A-L illustrate aspects of the graphical user interface for an application-level-runtime-state save-and-restore utility that represents one embodiment of the present invention. The graphical user interface ("GUI") shown in FIGS. 12A-L is part of an embodiment of the present invention referred to as the current environment restore tool ("CERT"). A small, low-display-footprint interface to CERT is shown in FIG. 12A. This interface 1202 includes a title bar 1204, a snapshot list 1206 from which a user can select snapshots for restoration, a restore button 1208 for invoking a restore operation, a save-snapshot button 1209 for saving the current application-level-runtime-state of the user's computer, and a graphical indication 1210 of the types of applications for which execution state can be restored.

Figure 12B:
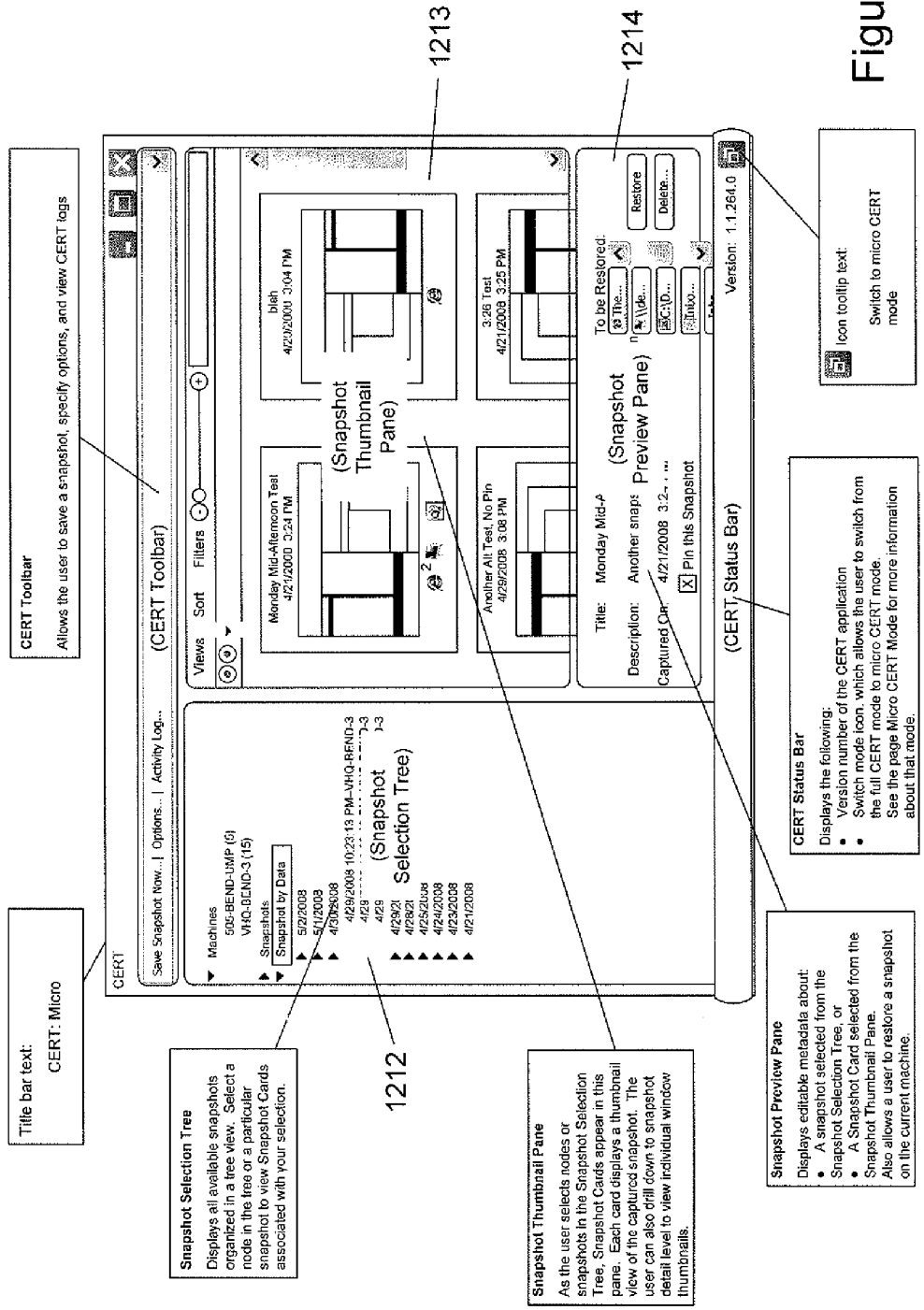

FIG. 12B shows a larger GUI for the CERT embodiment of the present invention. The larger GUI provides a more detailed representation of available snapshots 1212, including snapshots taken on other machines that can be imported and restored on a local machine. Snapshots are also represented by graphical images 1213, including screenshots of each open window and of the entire desktop that are captured during the snapshot process. These thumbnail screenshots can be expanded to full-screen size, before and during restoration, to facilitate restoration of fine-granularity state within executing applications by a user. Screenshots also serve to facilitate a user's recollection of the application-level runtime state of the computer system at the time of the snapshot. For example, viewing a screenshot spreadsheet may facilitate a user's reconstruction of the exact state of a spreadsheet and spreadsheet operations that were anticipated by the user at the time of the snapshot, to allow the user to recreate that state using various spreadsheet commands.

Figure 12C:
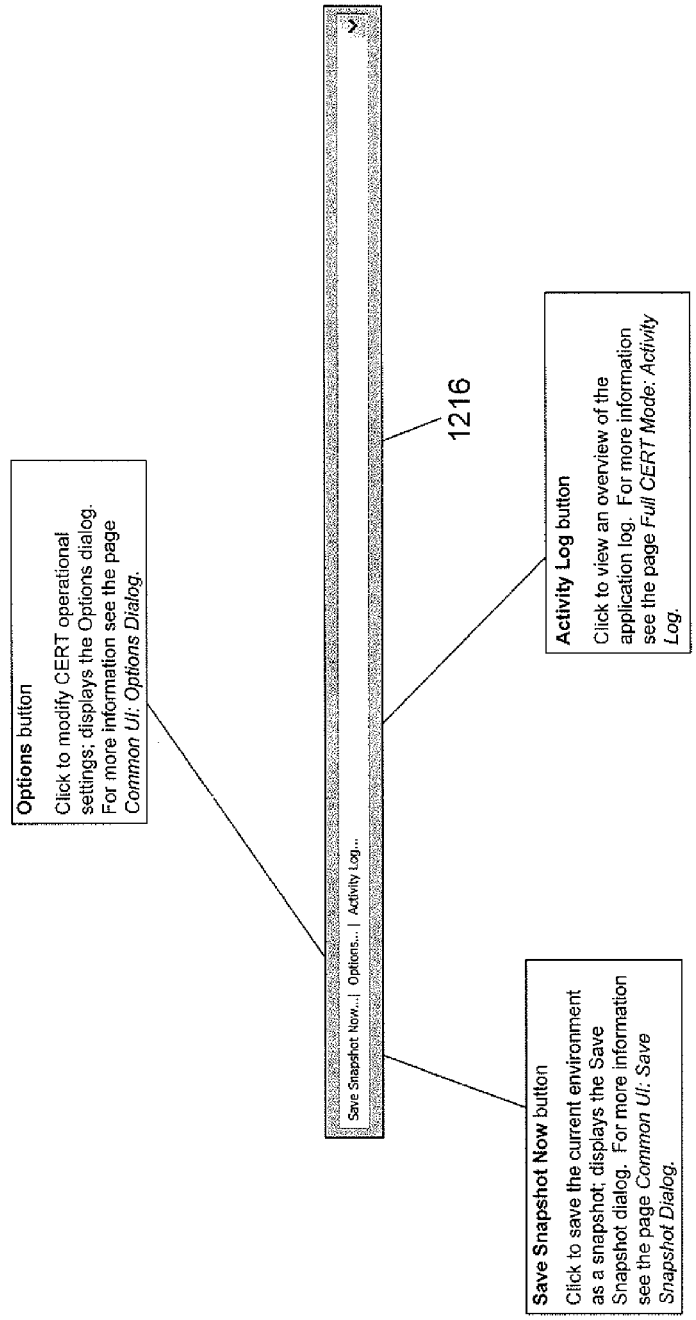
Figure 12D:
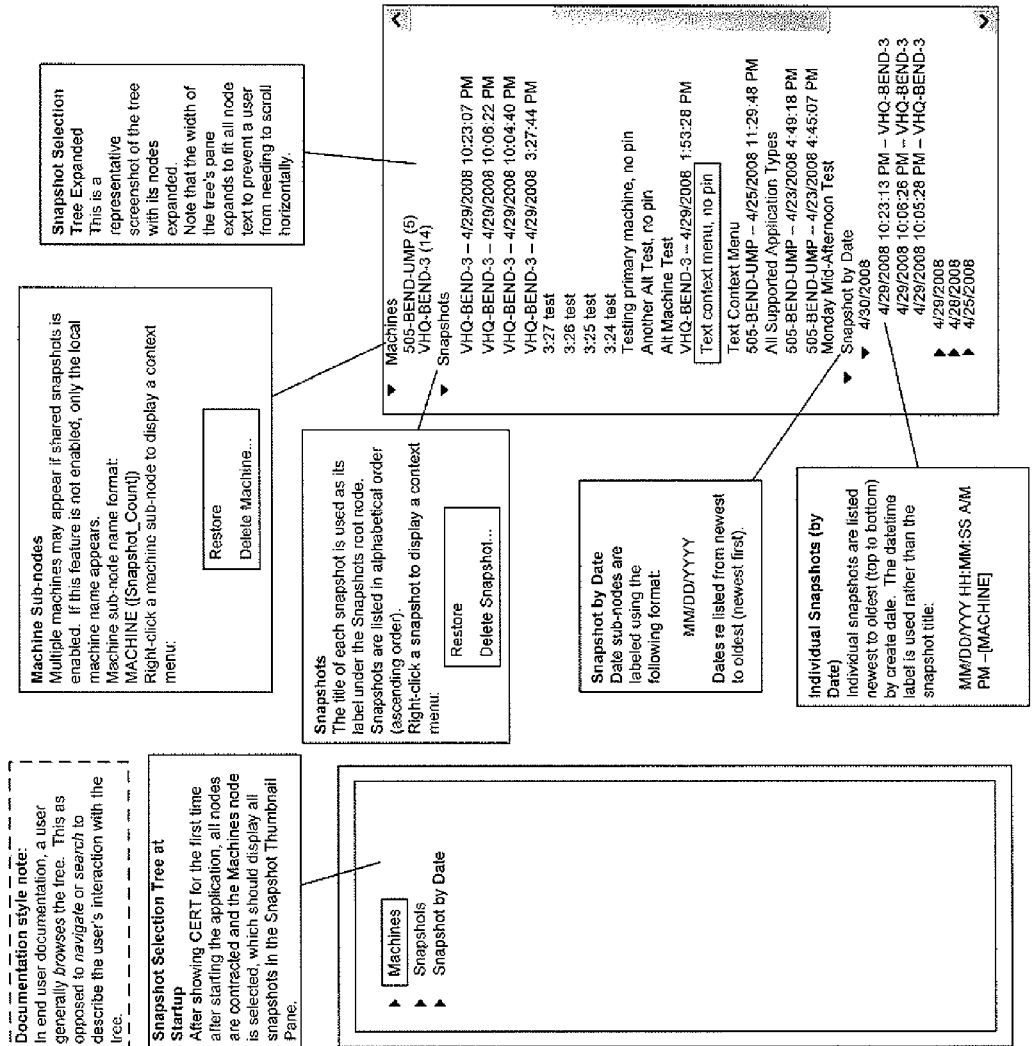
Figure 12E:
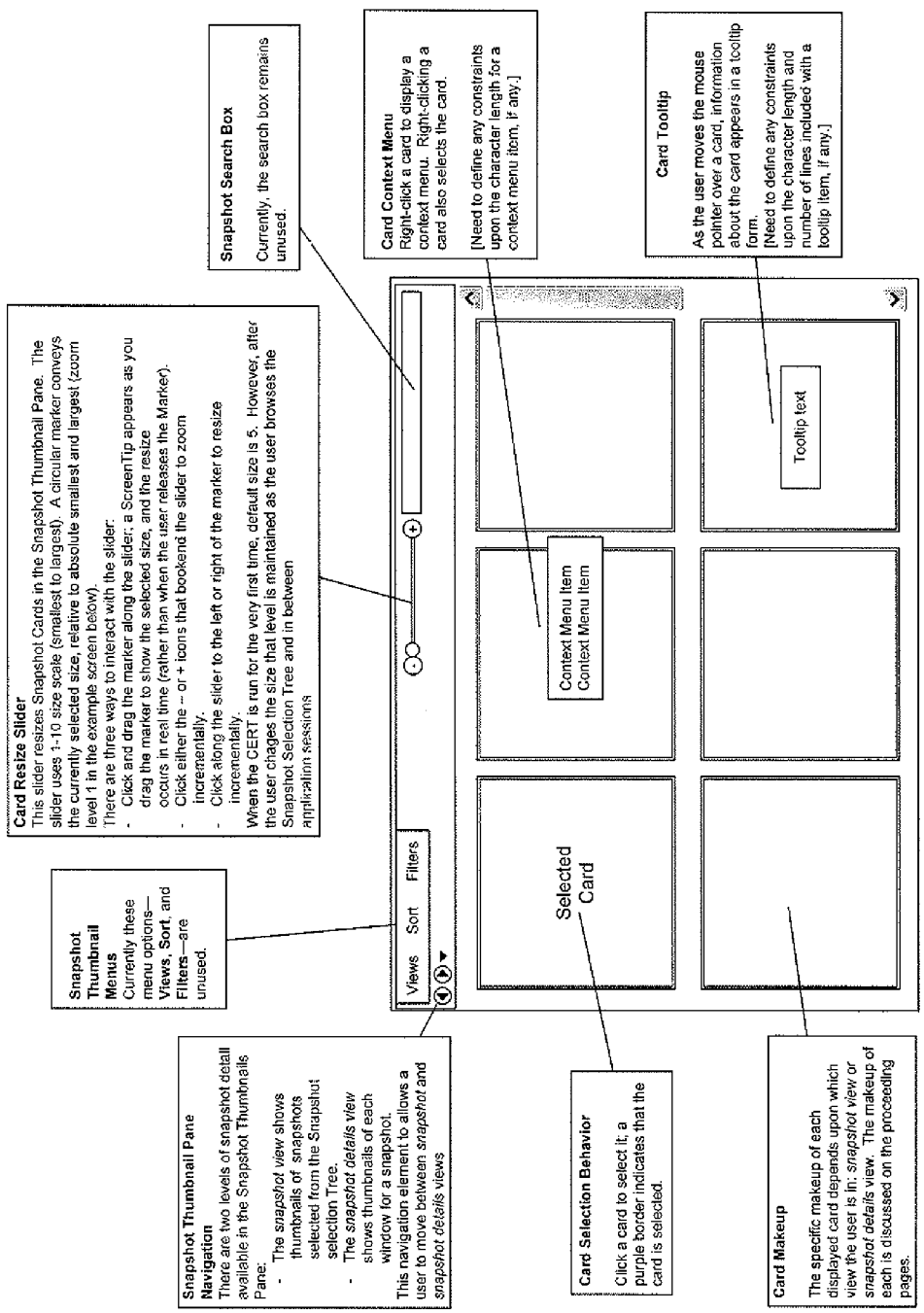
Figure 12F:
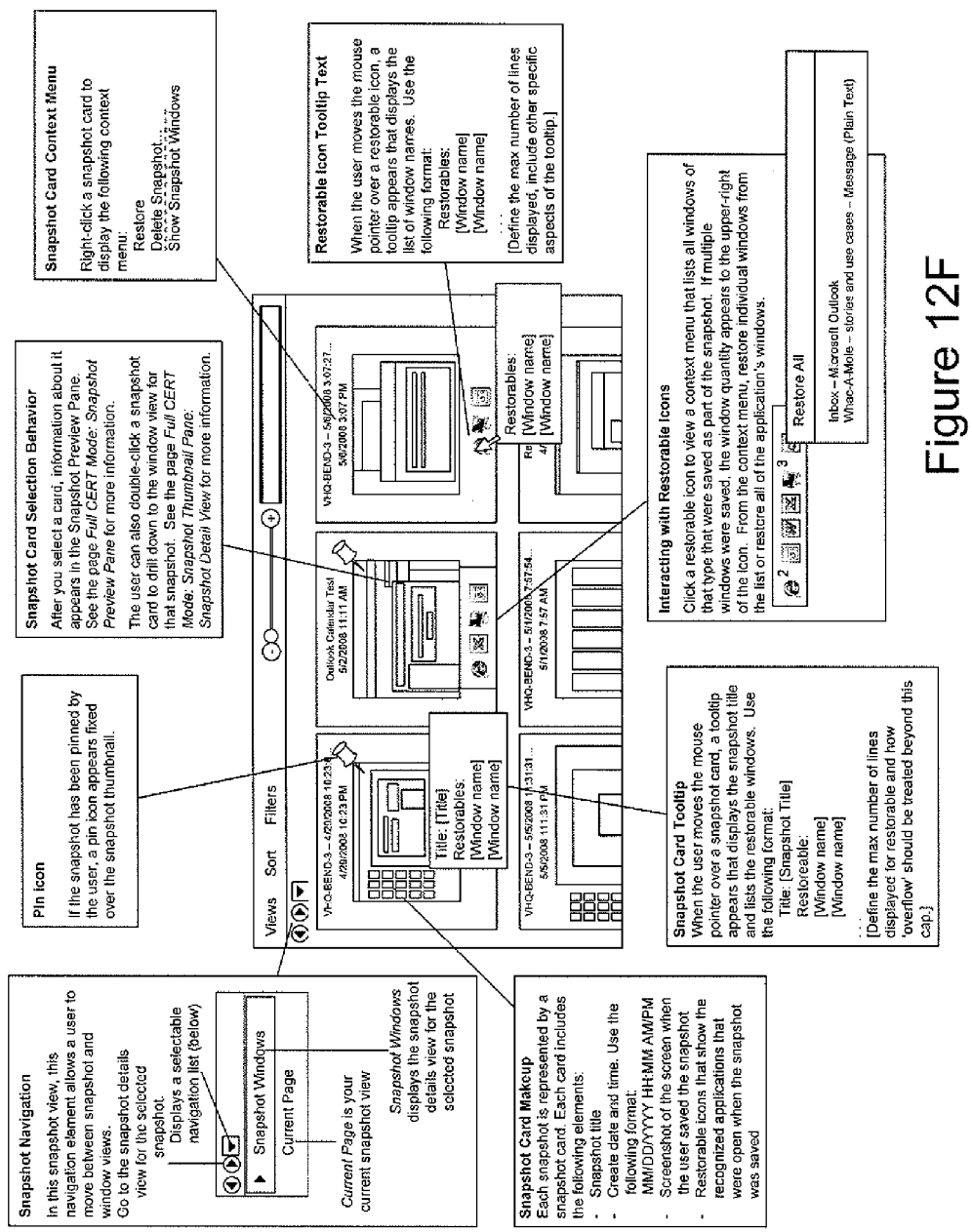
Figure 12G:
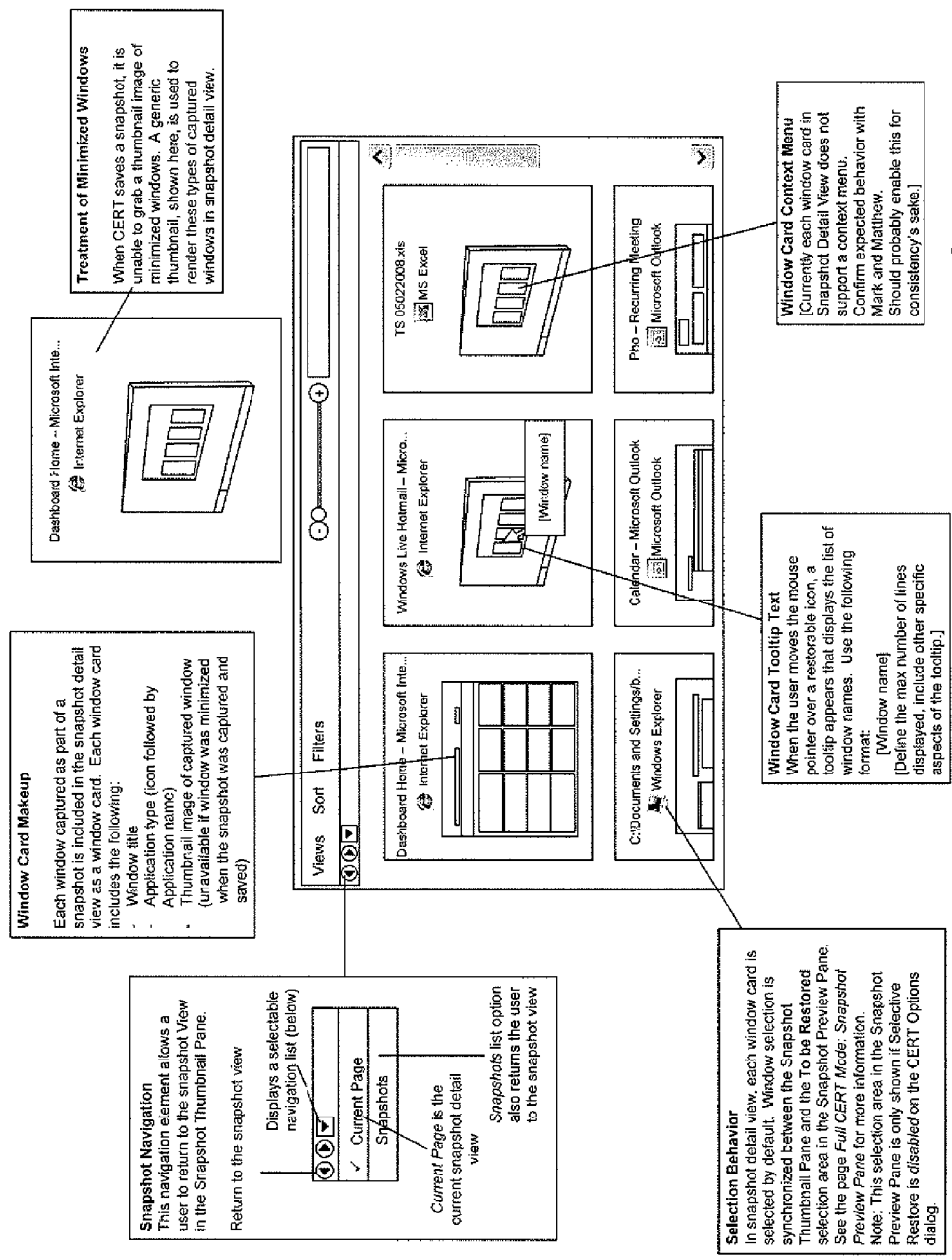
Figure 12H:
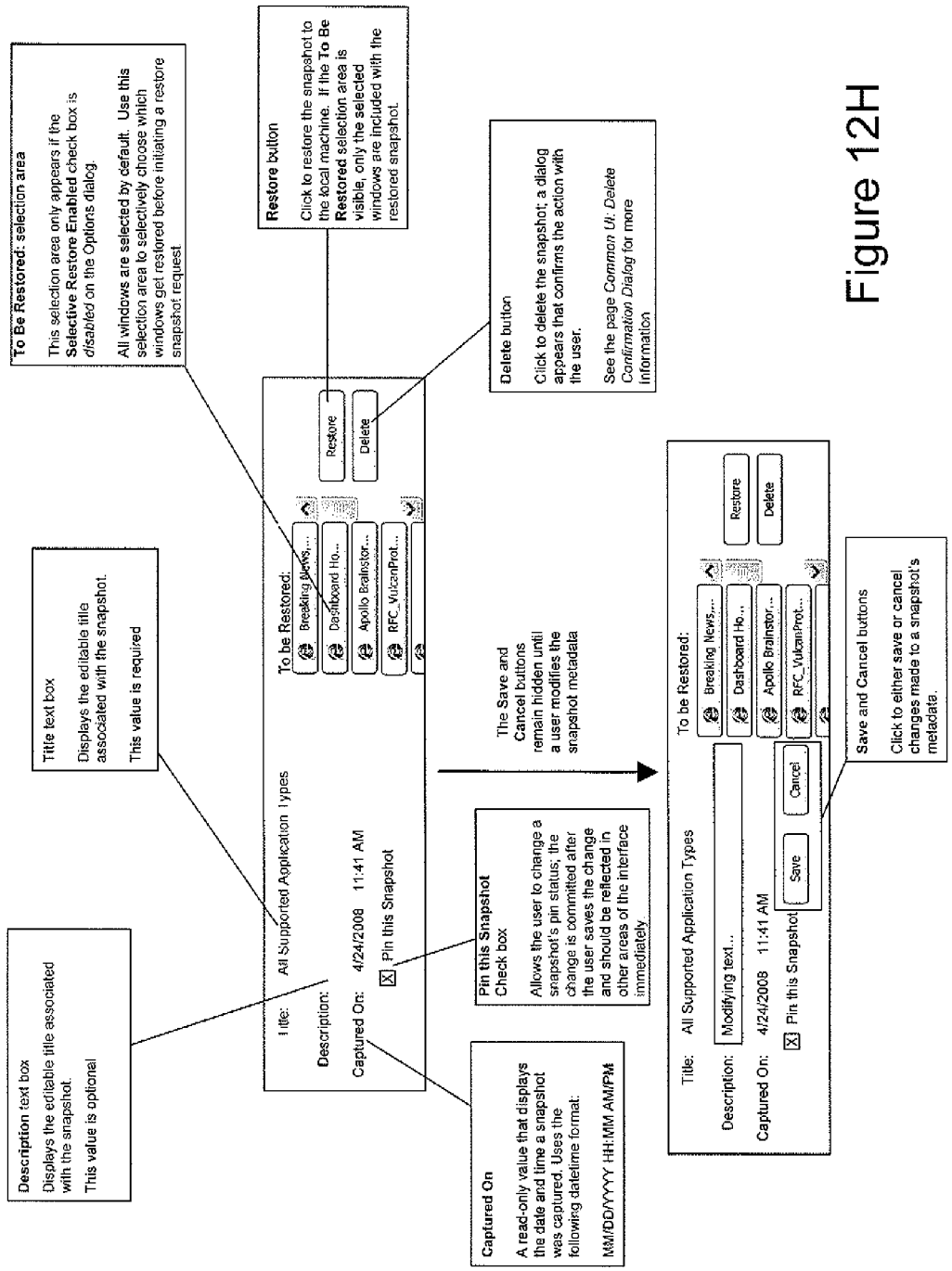
Figure 12I:
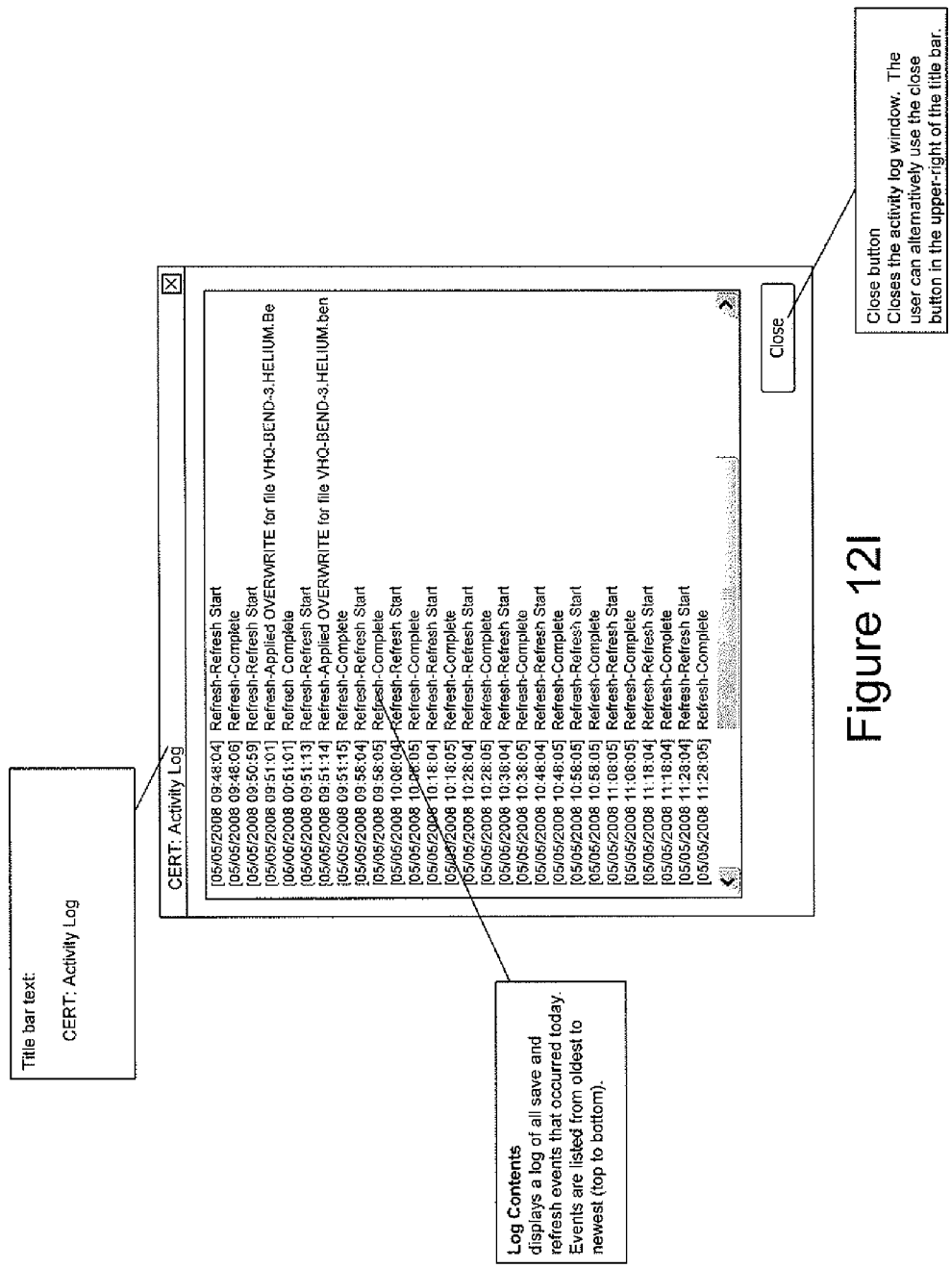
Figure 12J:
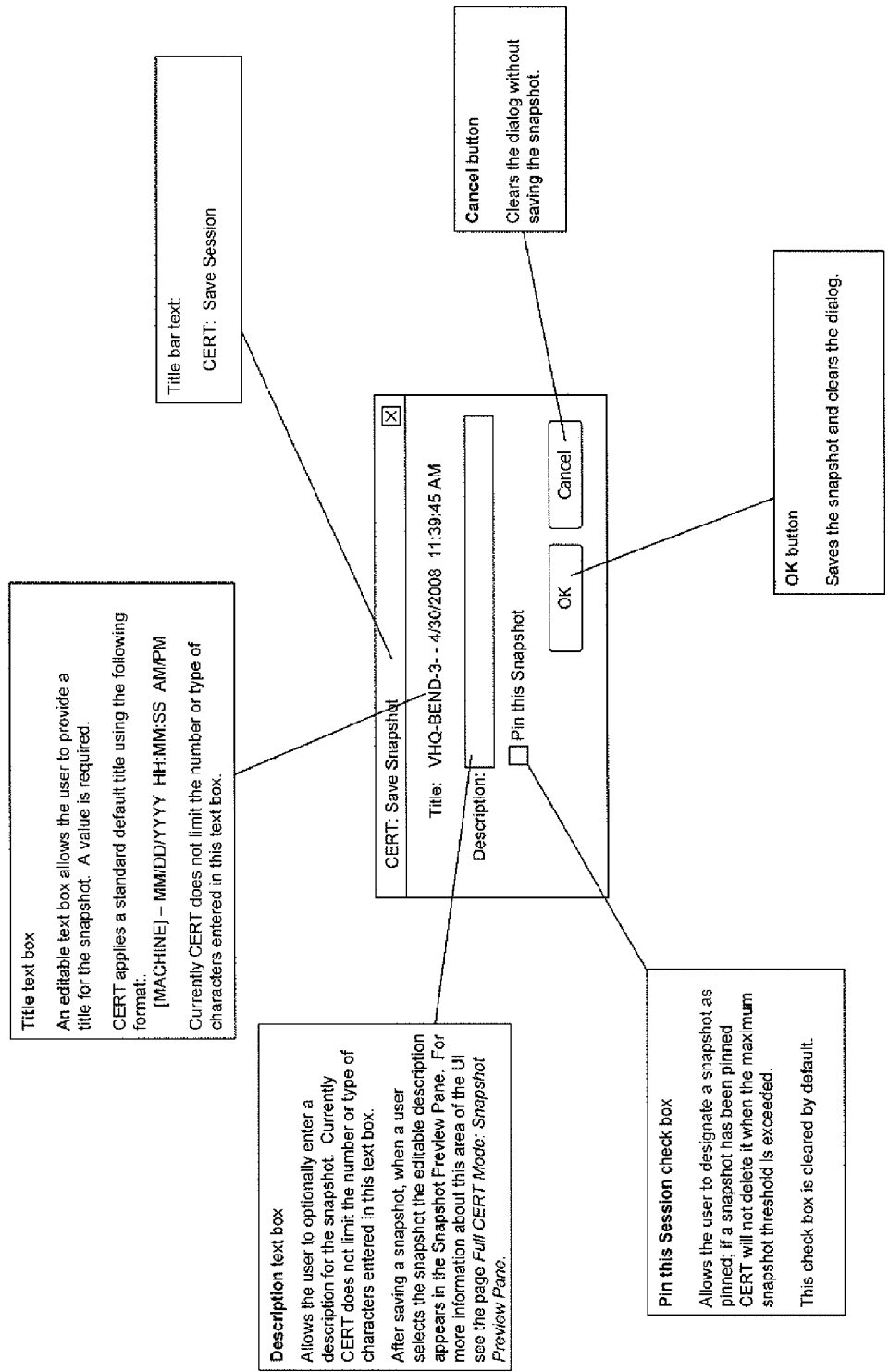
Figure 12K:
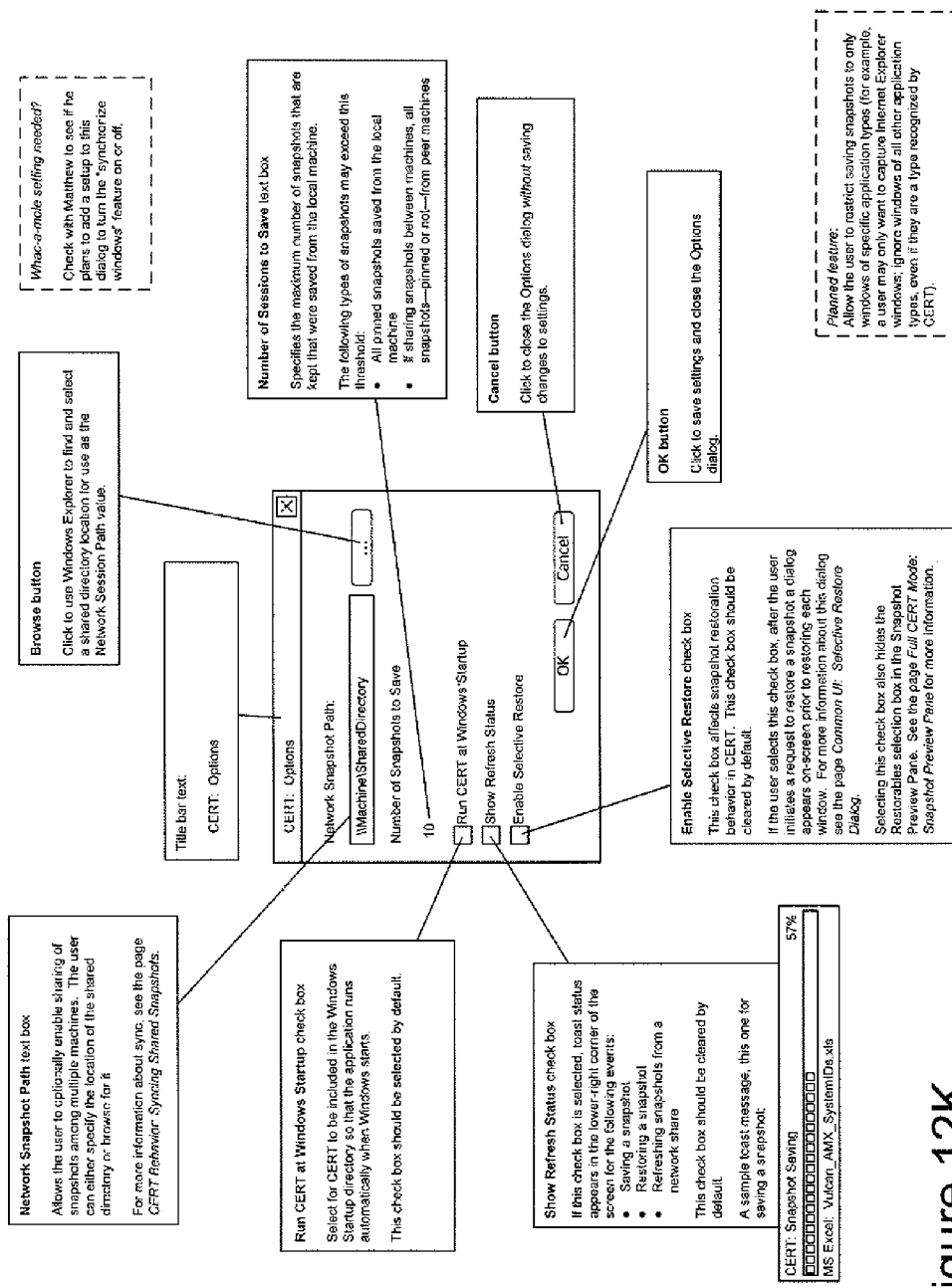
Figure 12L:
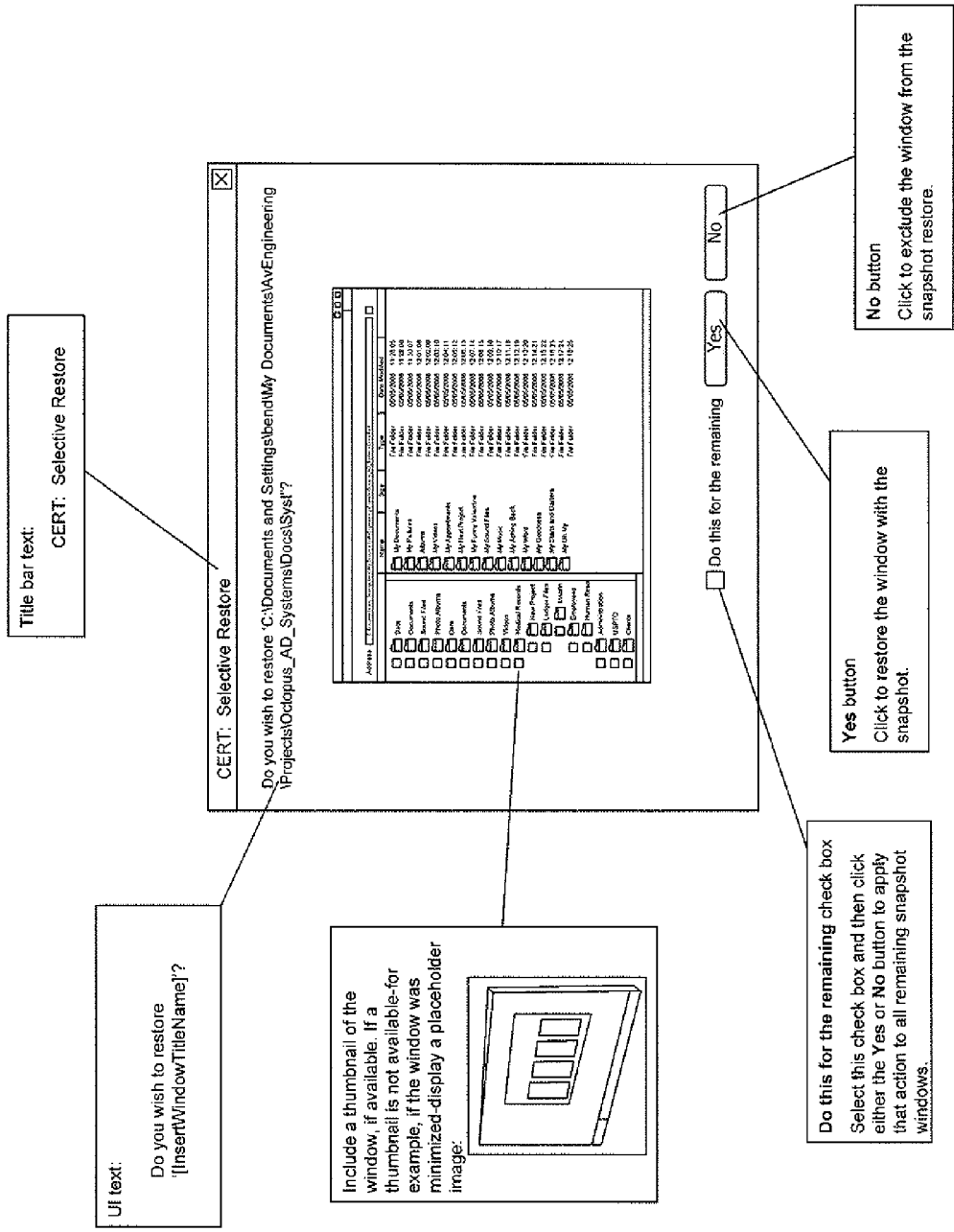
Figure 12M:
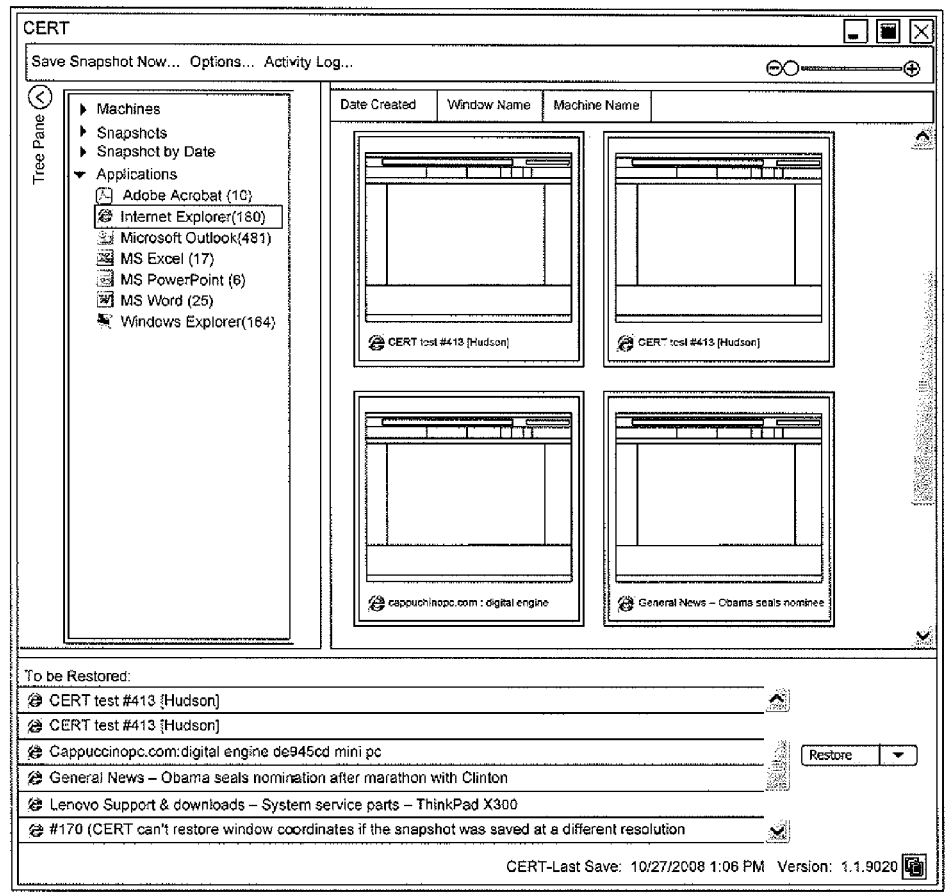

FIG. 12C shows details of a CERT toolbar included with a full-size interface shown in FIG. 12B. FIG. 12D illustrates details of the available-snapshot panel (1212 in FIG. 12B) included in the larger GUI. FIGS. 12E-G provide details of the thumbnail-based descriptions of snapshots (1213 in FIG. 12B). FIG. 12H illustrates details of the snapshot-preview pane (1214 in FIG. 12B) of the full-size GUI. FIG. 12I shows an expanded activity log invoked by means of the activity-log button (1216 in FIG. 12C) of the CERT toolbar. The activity log indicates all of the save-and-restore operations carried out over a selectable period of time. FIG. 12J shows an embodiment of the save-snapshot interface provided to a user to manually snapshot a current application-level runtime state of a computer system. FIG. 12K shows an options interface that allows a user to tailor operation of the CERT embodiment of the present invention to meet the user's needs. FIG. 12L shows a snapshot-restore interface provided to a user to allow a user to select a snapshot and restore the application-level runtime-state computer system encoded in that snapshot. FIG. 12M shows an alternative implementation of the larger GUI for the CERT embodiment of the present invention shown in FIG. 12B.

There are many different alternative embodiments of the present invention. As briefly discussed above, the application-level runtime-state save-and-restore tool of various embodiments of the present invention can be implemented to save only a very basic application-level state so that, upon restoration, a user is provided essentially with a set of launched applications and open windows associated with those applications. The most lightweight version of the present invention then requires a user to reconstruct details of the application-level runtime state through interactions with the launched applications. At the other extreme of embodiments of the present invention are embodiments which strive to store all possible available state information to facilitate precise restoration of the application states of all applications re-launched as part of the restoration process. This may involve storing redundant versions of files, objects, and other entities produced by, or accessed by, executing application programs. In general, it is not feasible to expect that the precise application-level state of executing applications can be faithfully restored, since embodiments of the present invention do not attempt to capture and store content of a computer system's virtual memory, file system, and machine-level electronic state. However, for many purposes, restoration, even when approximate, of an application-level state provides enormous benefit to users. The snapshots serve essentially as electronic bookmarks to an entire, long-term interaction of a user with a computer system, allowing a user to return to application states at particular points in time during that interaction and recover a significant portion of the application state that existed at the time the snapshot was made. In many cases, a user may seek only to recover an application state related to a particular application state. In this case, a lightweight approach, relying on screen capture to refresh a user's recollection, may be not only most efficient, but actually most desirable from the user's standpoint. As one example, a user may recall having accessed and having begun to read a particular email at a point in time prior to a particular snapshot, and may wish to recover only information in that email that is available in a screenshot of the email window, while indifferent to all other activities that were ongoing at the time of the snapshot.

Although the present invention has been described in terms of particular embodiments, it is not intended that the invention be limited to these embodiments. Modifications will be apparent to those skilled in the art. For example, embodiments of the present invention may be implemented in many different ways by varying familiar programming and development parameters, including programming languages, operating-system platforms, modular organization of implementations, control structures used in implementations, data structures used both in implementing the store-and-restore facilities as well as used in storing application-level runtime states, and by varying many other of these types of parameters and approaches. Application-level runtime-state save-and-restore utilities may be implemented for use in any number of different types of computers and computational environments, including distributed computing environments in which snapshots taken on a first machine can be used to restore an application-level runtime state on a second machine.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. An application-level-runtime-state save-and-restore utility comprising:
   a snapshot component, implemented as computer instructions stored on a tangible, physical computer-readable medium, that determines, encodes, and stores a snapshot of the current application-level runtime state of a computer system in a computer-readable medium by:
      storing snapshot-related information in a snapshot data structure,
      for each currently executing application program, storing information related to a current application-state in an application data structure, and
      linking the one or more application data structures created for the currently executing application programs to the snapshot data structure; and
   a restore component, implemented as computer instructions stored on a tangible, physical computer-readable medium, that restores the application-level runtime state of a computer system from a stored snapshot.

2. The application-level-runtime-state save-and-restore utility of claim 1 wherein the snapshot-related information includes:
   a snapshot name;
   a date and time for snapshot creation;
   a snapshot expiration time;
   a snapshot size;
   a name and domain of a user;
   a computer name and computer domain;
   a text description; and
   a reference to a screen shot of the contents of the display monitor.

3. The application-level-runtime-state save-and-restore utility of claim 1 wherein the information related to a current application-state includes:
   an application name;
   an executable filename;
   a file-system path;
   a version number;
   an ID;
   a plug-in ID; and
   a reference to a thumbnail description and/or image.

4. The application-level-runtime-state save-and-restore utility of claim 3 wherein the information related to a current application-state further includes
   a last-update date and time.

5. The application-level-runtime-state save-and-restore utility of claim 1 wherein the snapshot component further encodes the application-level runtime state of the computer system by:
   for each open resource associated with each application program, storing information related to the open resource in an open-resource data structure; and
   linking the open-resource data structures representing open resources associated with an application program to the application data structure representing the state of the application program.

6. The application-level-runtime-state save-and-restore utility of claim 5 wherein open resources include:
   open display windows;
   open files;
   open sockets; and
   other operating-system-provided entities and objects.

7. The application-level-runtime-state save-and-restore utility of claim 6 wherein the information related to an open display window that is stored in an open-resource data structure includes:
   a window name;
   a reference to a file or object, a representation of which is currently displayed in the open display window;
   an x,y position and current size of the open display window on the display-monitor screen;
   a z-position of the open display window with respect to other windows displayed on the display monitor;
   an x,y position of a cursor associated with the open display window; and
   a reference to a screenshot of the open display window.

8. The application-level-runtime-state save-and-restore utility of claim 6 wherein the information related to an open file that is stored in an open-resource data structure includes:
   a name of the file;
   a file-system path;
   a current active position within the file;
   a creation date and time of the file;
   a last update date and time; and
   an indication of the file type.

9. An application-level-runtime-state save-and-restore utility comprising:
   a snapshot component, implemented as computer instructions stored on a tangible, physical computer-readable medium, that determines, encodes, and stores a snapshot of the current application-level runtime state of a computer system in a computer-readable medium; and
   a restore component, implemented as computer instructions stored on a tangible, physical computer-readable medium, that restores the application-level runtime state of a computer system from a stored snapshot by
      accessing a stored snapshot data structure according to information supplied through a restore-snapshot interface,
      for each application data structure linked to the snapshot data structure,
         using information in the application data structure to launch a corresponding application program, and
         for each open-resource data structure linked to the application data structure,
            using information in the open-resource data structure to open a resource and associate the opened resource with the launched application program.

10. The application-level-runtime-state save-and-restore utility of claim 9 further including reissuing application commands to an application program following launch of the application program.

11. The application-level-runtime-state save-and-restore utility of claim 9 wherein an application-level-runtime state encoded as a snapshot on a first computer is restored by the restore component of an instance of the application-level-runtime-state save-and-restore utility on a second computer.

12. The application-level-runtime-state save-and-restore utility of claim 11 wherein the restored application-level-runtime state on the second state is restored on behalf of the user who saved the snapshot.

13. The application-level-runtime-state save-and-restore utility of claim 11 wherein the restored application-level-runtime state on the second state is restored on behalf of a user different from the user who saved the snapshot.

14. The application-level-runtime-state save-and-restore utility of claim 9 wherein an application-level-runtime state can be restored incrementally and selectively by a user.

15. An application-level-runtime-state save-and-restore component within a computer system having one or more processors, one or more electronic memories, and one or more mass-storage devices, the application-level-runtime-state save-and-restore component comprising:

- a snapshot subcomponent, implemented as computer instructions stored on one or more of the one or more mass-storage devices, on one or more electronic memories of the one or more electronic memories, or on both one or more of the one or more mass-storage devices and one or more electronic memories of the one or more electronic memories, that determines, encodes, and stores a snapshot of the current application-level runtime state of a computer system in a computer-readable medium by storing snapshot-related information in a snapshot data structure, for each currently executing application program, storing information related to a current application-level runtime state in an application data structure, and linking the one or more application data structures created for the currently executing application programs to the snapshot data structure, and

- a restore subcomponent, implemented as computer instructions stored on one or more of the one or more mass-storage devices, on one or more electronic memories of the one or more electronic memories, or on both one or more of the one or more mass-storage devices and one or more electronic memories of the one or more electronic memories, that restores the application-level runtime state of a computer system from a stored snapshot.

16. The application-level-runtime-state save-and-restore component of claim 15 further comprising:

a snapshot-management subcomponent that provides an interface which provides for searching, displaying information about, deleting, editing, and organizing snapshots.

17. The application-level-runtime-state save-and-restore component of claim 16 wherein the snapshot-management subcomponent displays screenshots and descriptions of each snapshot stored on the computer system or accessible to the computer system.

18. The application-level-runtime-state save-and-restore component of claim 15 wherein the application-level-runtime-state save-and-restore component determines the application-level runtime state of the computer system by:

executing operating-system calls to identify each currently executing application program; and for each currently executing application program, executing operating-system calls and/or application-program-interface calls to determine the current execution state of the application program.

19. The application-level-runtime-state save-and-restore component of claim 18 wherein the current execution state of the application program includes:

open windows associated with the application program;

information displayed in the open windows associated with the application program; and other open resources associated with the application program, including open file-system files.

20. The application-level-runtime-state save-and-restore component of claim 19 wherein the current execution state of the application program further includes:

a list of application commands executed by the application program.

* * * * *